United States Patent [19]

Yamane et al.

[11] Patent Number: 5,717,588

[45] Date of Patent: Feb. 10, 1998

[54] PROGRAMMING SYSTEM

[75] Inventors: Nobuo Yamane; Hiroyasu Nagaoka; Ayumi Matsuura; Hirotsugu Hamano, all of Hiroshima-ken, Japan

[73] Assignee: Mazda Motor Corporation, Hiroshima-ken, Japan

[21] Appl. No.: 623,126

[22] Filed: Mar. 28, 1996

[30] Foreign Application Priority Data

Mar. 30, 1995 [JP] Japan .................. 7-073019

[51] Int. Cl.⁶ .................. G06F 9/45; G05B 11/01
[52] U.S. Cl. .................. 361/191; 364/140; 364/147; 364/190; 364/DIG. 1; 364/DIG. 2
[58] Field of Search .................. 364/140, 147, 364/190, 191, DIG. 1, DIG. 2, 926.9, 927.2, 921, 946.2; 395/183.14

[56] References Cited

U.S. PATENT DOCUMENTS

| | | | |
|---|---|---|---|
| 4,519,026 | 5/1985 | Nozawa et al. | 364/167 |
| 5,295,059 | 3/1994 | Brooks et al. | 364/147 |
| 5,349,518 | 9/1994 | Zifferer et al. | 364/192 |
| 5,463,544 | 10/1995 | Ohta | 364/147 |
| 5,485,366 | 1/1996 | Iwata | 364/140 |
| 5,623,401 | 4/1997 | Baxter | 364/147 |

FOREIGN PATENT DOCUMENTS 1204104  8/1989  Japan .

Primary Examiner—James P. Trammell
Assistant Examiner—Shah Kamini
Attorney, Agent, or Firm—Sixbey, Friedman, Leedom & Ferguson; Gerald J. Ferguson, Jr.; Donald R. Studebaker

[57] ABSTRACT

A sequence program formed by a plurality of contacts or windings each given an actual address representing a name of a mechanism such as a truck, a lifter, a slide or the like which forms a system to be controlled and the action of which is to be controlled to control the system, a name of an action of the mechanism and a name of a controlled device such as a switch, a solenoid valve, a motor and the like which is directly controlled to control the action of the mechanism is prepared. A first transitional sequence program in which each contact or winding is given a variable label is created by designating or selecting standardized control circuits corresponding to the desired actions of the mechanisms forming the system to be controlled, and a second transitional sequence program in which each contact or winding is given a fixed label is created by designating the names of the mechanisms and the actions thereof, and a sequence program in which each contact or winding is given an actual address is created on the basis of a table representing correspondence between the fixed labels and the actual addresses.

10 Claims, 35 Drawing Sheets

FIG. 1B

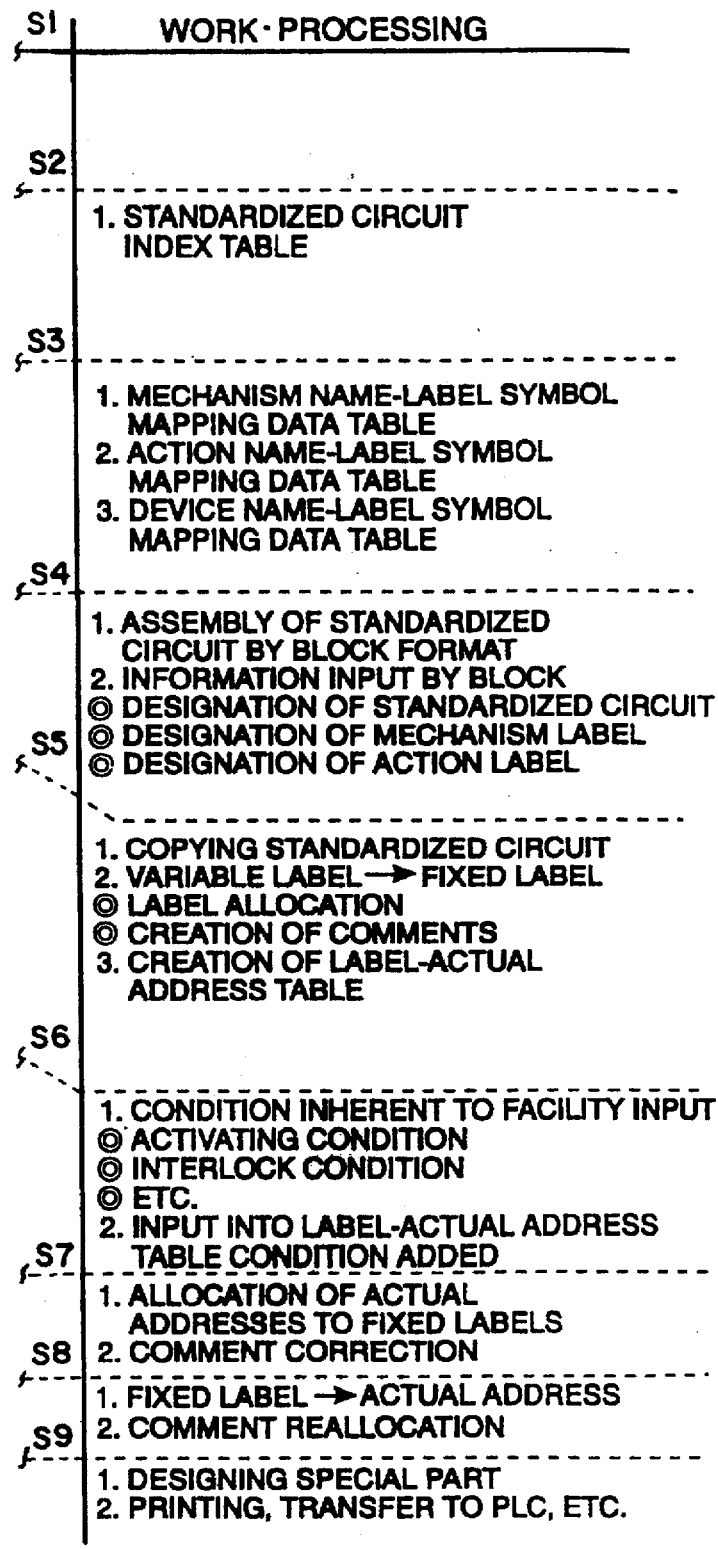

- S1 — WORK-PROCESSING
- S2
  1. STANDARDIZED CIRCUIT INDEX TABLE
- S3
  1. MECHANISM NAME-LABEL SYMBOL MAPPING DATA TABLE
  2. ACTION NAME-LABEL SYMBOL MAPPING DATA TABLE
  3. DEVICE NAME-LABEL SYMBOL MAPPING DATA TABLE
- S4
  1. ASSEMBLY OF STANDARDIZED CIRCUIT BY BLOCK FORMAT
  2. INFORMATION INPUT BY BLOCK
     ◎ DESIGNATION OF STANDARDIZED CIRCUIT
     ◎ DESIGNATION OF MECHANISM LABEL
     ◎ DESIGNATION OF ACTION LABEL
- S5
  1. COPYING STANDARDIZED CIRCUIT
  2. VARIABLE LABEL → FIXED LABEL
     ◎ LABEL ALLOCATION
     ◎ CREATION OF COMMENTS
  3. CREATION OF LABEL-ACTUAL ADDRESS TABLE
- S6
  1. CONDITION INHERENT TO FACILITY INPUT
     ◎ ACTIVATING CONDITION
     ◎ INTERLOCK CONDITION
     ◎ ETC.
  2. INPUT INTO LABEL-ACTUAL ADDRESS TABLE CONDITION ADDED
- S7
  1. ALLOCATION OF ACTUAL ADDRESSES TO FIXED LABELS
  2. COMMENT CORRECTION
- S8
  1. FIXED LABEL → ACTUAL ADDRESS
  2. COMMENT REALLOCATION
- S9
  1. DESIGNING SPECIAL PART
  2. PRINTING, TRANSFER TO PLC, ETC.

| REGISTERED PATH | FILE NAME | CIRCUIT NAME |
|---|---|---|
| C:¥SCAD¥ | TSTA1 | 2-POSITION VALVE CIRCUIT |
| ¦:¥ | TSTA2 | 3-POSITION VALVE WITH BRAKE CIRCUIT |
| ¦:¥ | TSTA3 | 3-POSITION VALVE CIRCUIT |
| ¦:¥ | TSTA4 | MITSUBISHI FR-A(Z) INVERTER CONTROL CIRCUIT(1) |
| ¦:¥ | TSTA5 | INVERTER INSTRUCTION CIRCUIT (ONE WAY ONLY) |
| ¦:¥ | TSTA6 | INVERTER INSTRUCTION CIRCUIT (BACK-FORTH SET) |
| ¦:¥ | TSTW1 | AUTOMATIC MACHINE MODE & GENERAL CIRCUIT |
| ¦:¥ | TSTW2 | AUTOMATIC MACHINE ACTIVATION CIRCUIT |
| ¦:¥ | TSTW3 | AUTOMATIC MACHINE 2-POSITION VALVE CIRCUIT(1) |
| ¦:¥ | TSTW4 | AUTOMATIC MACHINE CYLINDER WITH BRAKE CIRCUIT |
| ¦:¥ | TSTW5 | AUTOMATIC MACHINE WELDING GUN PRESSURIZING CIRCUIT |
| ¦:¥ | TSTW6 | WELDER TIMER CIRCUIT |
| ¦:¥ | TSTW7 | LS MONITOR CIRCUIT |

FIG. 2

| MECHANISM NAME | MECHANISM LABEL |
|---|---|
| P&F CONVEYOR | PFC |
| POSITIONING | LOK |
| APRON CONVEYOR | ECV |
| ELEVATOR | ELV |
| PRESSING | PUS |
| OSCILLATING CONVEYOR | OCV |
| GUN | GUN |
| REFERENCE PIN | PI |
| CARRY | CRY |
| CLAMP | CLP |
| CONVEYOR | CNV |
| SHIFT | SF |
| CAR TYPE SENSING | SYA |
| SHOOT | SHT |
| OUTPUT SHAFT | OUX |
| SCREW CONVEYOR | SCV |
| STOPPER | ST |

| ACTION NAME | ACTION LABEL | REVERSE ACTION NAME |
|---|---|---|
| POSITION | PS | |
| DRIVE | DR | |
| PRESSURIZE | GR | RELEASE |
| RELEASE | EM | PRESSURIZE |
| OPEN | OP | CLOSE |
| CLOSE | CL | OPEN |
| SEATED | ZI | |
| WORK END | EN | |
| IN USE | US | |
| UPPER LIMIT | UL | LOWER LIMIT |
| INTERMEDIATE | ML | |
| LOWER LIMIT | DL | UPPER LIMIT |
| UP | UP | DOWN |
| DOWN | DW | UP |
| | | |

| COMMENT | LABEL | MEANING | COMMENT | LABEL | MEANING |
|---|---|---|---|---|---|
| 7SEG | 7SG | 7SEG | ALONE | TAN | ALONE |
| CPU ABNORMAL | CPUER | CPU ABNORMAL | DAMPER | DMP | DAMPER |
| CPU RUN | CPUOK | CPU RUN | COMMUNICATION ABNORMAL | TUSER | COMMUNICATION ABNORMAL |
| CP TRIP | CPT | CP TRIP | AT HAND | GEN | AT HAND |
| LS ABNORMAL | LSER | LS ABNORMAL | DOOR | DOR | DOOR |
| PRESSURE ABNORMAL | PREE | PRESSURE ABNORMAL | BATTERY VOLTAGE LOWER | BATER | BATTERY VOLTAGE LOWER |
| SAFETY PLUG | SP | SAFETY PLUG | EMERGENCY STOP | ES | EMERGENCY STOP |
| ABNORMALITY RESET | RST | ABNORMALITY RESET | BUZZER | BZ | BUZZER |
| INVERTER ABNORMAL | INVE | INVERTER ABNORMAL | BUZZER STOP | BZST | BUZZER STOP |
| READY TO OPERATION | RD | READY TO OPERATION | FOOT S/W | FTS | FOOT S/W |

F I G. 5

<LADDER DESIGN SUPPORT> * BLOCK FLOW CREATION *
DRIVE : d   directory : ¥ ncadsys ¥ blkflow
SUB DIRECTRY : J55TEST   (AUTOMATIC WELDER SAMPLE)

| 0004 |
| 0005 |
| 0006 |
| 0007 |
| 0008 |

| 0009 |

5002| ↑ ↓ → ←   DETERMINE POSITION, KEY IN BLOCK NUMBER
PF02  PF04  PF05  PF06  PF07                    PF11
INPUT  ─┤   ─┬─   ─┴─   SWITCH                   END

| REGISTERED PATH | FILE NAME | CIRCUIT NAME |
|---|---|---|
| C:\SCAD\ | TSTA1 | 2-POSITION VALVE CIRCUIT |
| H:\ | TSTA2 | 3-POSITION VALVE WITH BRAKE CIRCUIT |
| H:\ | TSTA3 | 3-POSITION VALVE CIRCUIT |
| H:\ | TSTA4 | INVERTER CONTROL CIRCUIT (1) |

FIG.13B

| MECHANISM NAME | LABEL NO. |
|---|---|
| P&F CONVEYOR | PFC |
| POSITIONING | LOK |
| APRON CONVEYOR | ECV |
| ELEVATOR | ELV |
| PRESING | PUS |
| OSCILLATING CONVEYOR | OCV |
| GUN | GUN |
| REFERENCE PIN | PI |
| CARRY | CRY |
| CLAMP | CLP |
| CONVEYOR | CNV |
| SHIFT | SF |
| CAR TYPE SENSING | SYA |
| SHOOT | SHT |
| OUTPUT SHAFT | OUX |
| SCREW CONVEYOR | SCV |
| STOPPER | ST |
| ROTATION | TRN |
| CENTERING | CEN |
| DIVERTOR | DIV |
| STAGE CHANGE | DAN |
| DAMPER | DMP |
| CHAIN CONVEYOR | CCV |
| CHUCK | CHK |
| TABLE | TBL |
| ELECTRIC TRUCK | DEN |

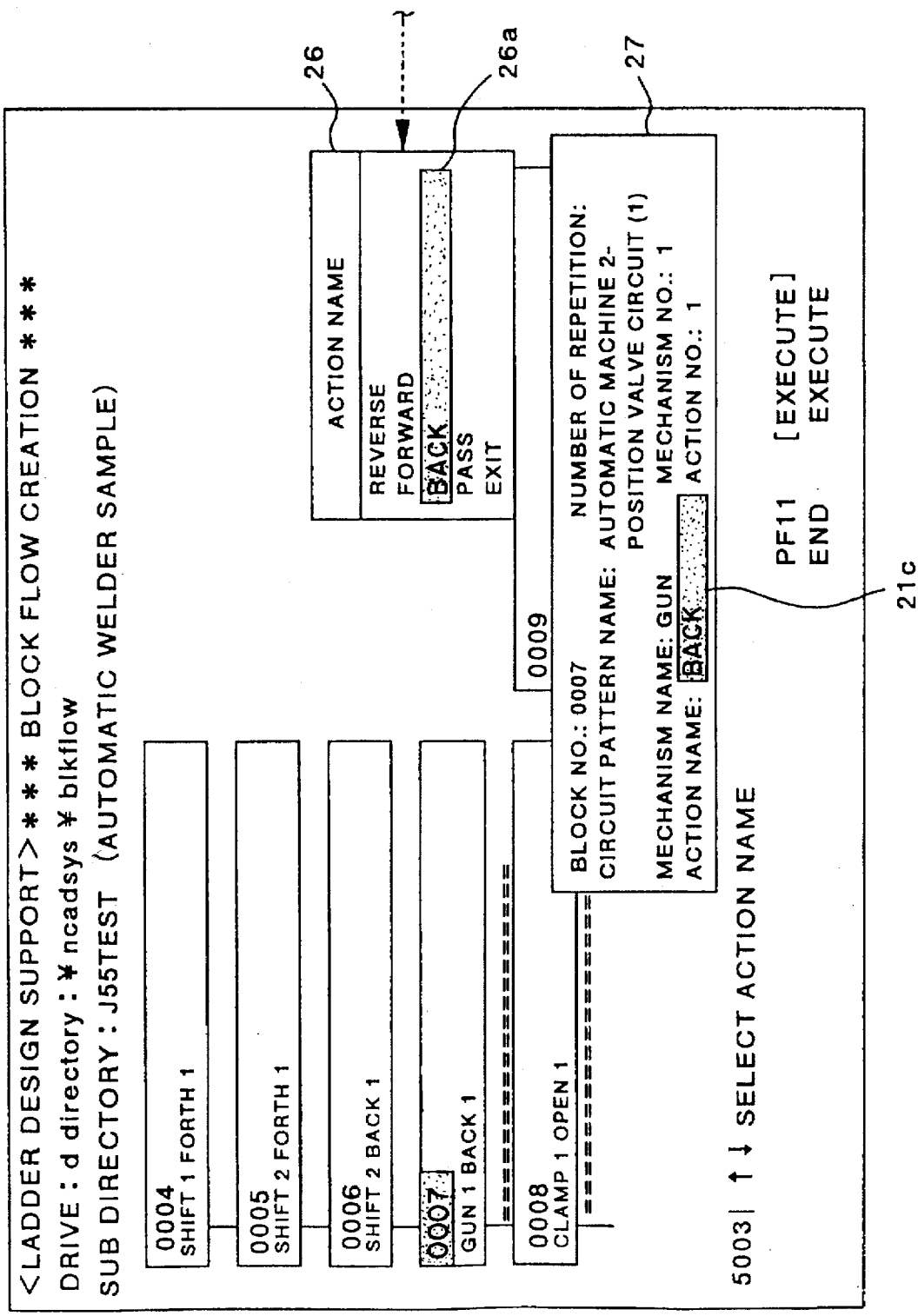

FIG.14B

| ACTION NAME | LABEL | REVERSE ACTION NAME |
|---|---|---|
| POSITION | PS | |
| DRIVE | DR | |
| PRESSURIZE | GR | RELEASE |
| RELESE | EM | PRESSURIZE |
| OPEN | OP | CLOSE |
| CLOSE | CL | OPEN |
| SEATED | ZI | |
| WORK END | EN | |
| IN USE | US | |
| UPPER LIMIT | UL | LOWER LIMIT |
| INTERMEDIATE | ML | |
| LOWER LIMIT | DL | UPPER LIMIT |
| UP | UP | DOWN |
| DOWN | DW | UP |
| REGULAR | FT | REVERSE |
| REVERSE | RE | REGULAR |
| FORWARD | FD | BACK |
| BACK | BK | FORWARD |
| PASS | TF | |
| EXIT | UO | RETURN |
| RETURN | HO | EXIT |
| STOP | ST | |

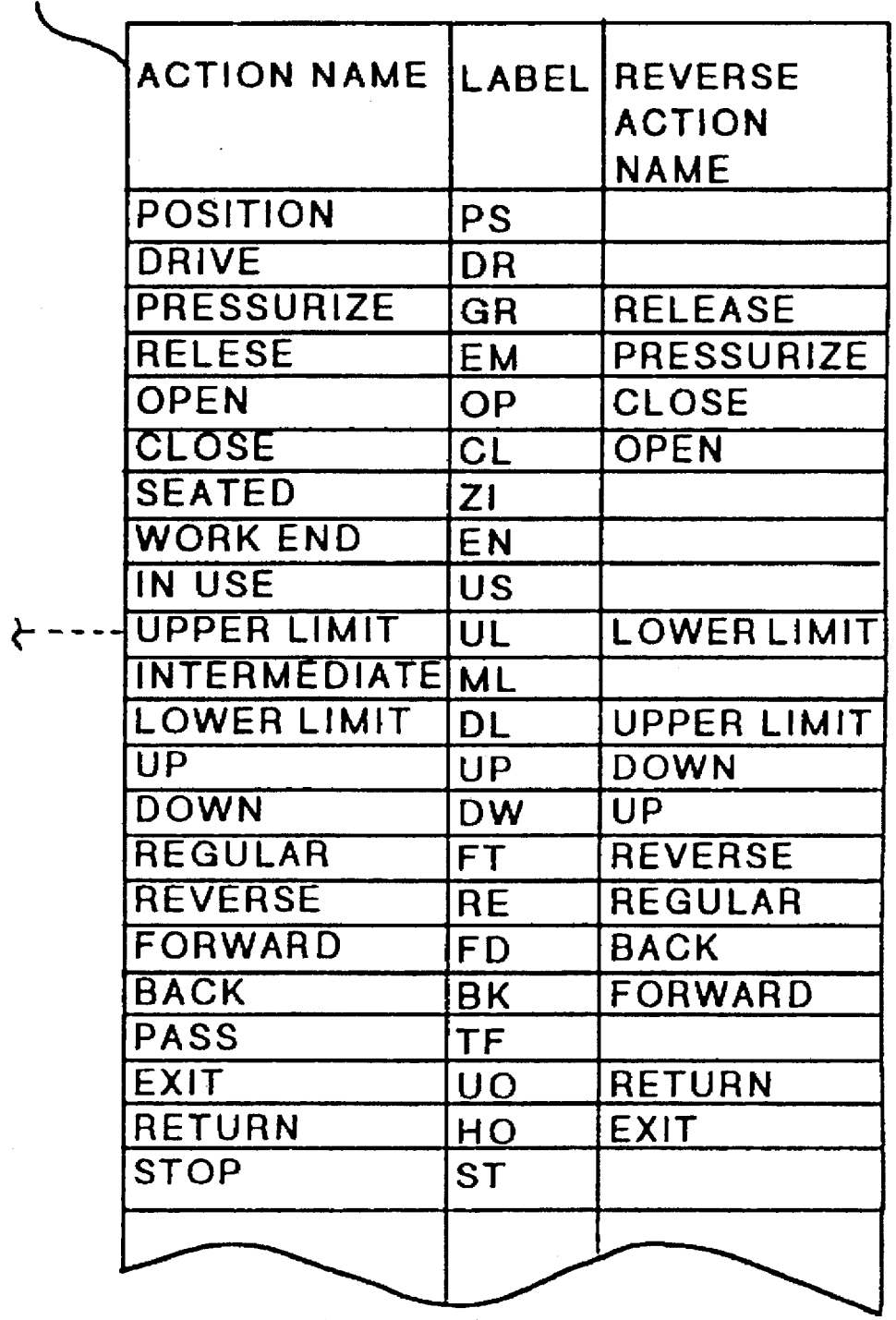

FIG.16A

| BLOCK NO. | LABEL | | | ACTION | ACTION NO. | SUB | ACTUAL ADDRESS | COMMENT 1 | COMMENT 2 | COMMENT 3 |
|---|---|---|---|---|---|---|---|---|---|---|
| | DEVICE | MECHANISM | MECHANISM NO. | | | | | | | |
| 001 | ILST | ST | 1 | OP | 1 | | | STOPPER 1 OPEN 1 ACTIVATING CONDITION | | |
| 001 | ILAT | ST | 1 | OP | 1 | | | STOPPER 1 OPEN 1 AUTOMATIC INTERLOCK | | |
| 001 | ILMN | ST | 1 | OP | 1 | | | STOPPER 1 OPEN 1 MANUAL INTERLOCK | | |
| 001 | ILCM | ST | 1 | OP | 1 | | | STOPPER 1 OPEN 1 COMMON INTERLOCK | | |
| 001 | AUTOMODE | | | | | | | AUTOMATIC MODE | | |
| 001 | AUTORUN | | | | | | | IN AUTOMATIC OPERATION | | |
| 001 | CR | ST | 1 | CL | 1 | | | STOPPER 1 CLOSE 1 INSTRUCTION | | |
| 001 | CR | ST | 1 | OP | 1 | | | STOPPER 1 OPEN 1 INSTRUCTION | | |
| 001 | PB | ST | 1 | OP | 1 | | | STOPPER 1 CLOSE 1 PUSH BUTTON | | |

| | MANUMODE | | | | MANUAL MODE | | |
|---|---|---|---|---|---|---|---|
| 001 | LS | 1 | | | | | |
| 001 | SV | 1 | OP | 1 | STOPPER 1 OPEN 1 END | | |
| 001 | ILST | 1 | OP | 1 | STOPPER 1 OPEN 1 OUTPUT | | |
| 002 | ILAT | 1 | UP | 1 | LIFTER UP 1 ACTIVATION INSTRUCTION | | |
| 002 | ILMN | 1 | UP | 1 | LIFTER UP 1 AUTOMATIC INTERLOCK | | |
| 002 | ILCM1 | 1 | UP | 1 | LIFTER UP 1 MANUAL INTERLOCK | | |
| 002 | ILCM2 | 1 | UP | 1 | LIFTER UP 1 COMMON INTERLOCK 1 | | |
| 002 | ILCM3 | 1 | UP | 1 | LIFTER UP 1 COMMON INTERLOCK 2 | | |
| 002 | PB | 1 | UP | 1 | LIFTER UP 1 COMMON INTERLOCK 3 | | |
| 002 | | | | | LIFTER UP 1 PUSH BUTTON | | |

| | | | | | |
|---|---|---|---|---|---|
| 002 | CR | LF | 1 | DW | 1 | | LIFTER 1 DOWN 1 INSTRUCTION |
| 002 | CR | LF | 1 | UP | 1 | | LIFTER 1 UP 1 INSTRUCTION |
| 002 | SV | LF | 1 | UP | 1 | | LIFTER 1 UP 1 OUTPUT |
| 003 | ILST | PI | 1 | UP | 1 | | REFERENCE PIN 1 UP 1 ACTIVATING CONDITION |
| 003 | ILAT | PI | 1 | UP | 1 | | REFERENCE PIN 1 UP 1 AUTOMATIC |
| 003 | ILMN | PI | 1 | UP | 1 | | REFERENCE PIN 1 UP 1 MANUAL |
| 003 | ILCM1 | PI | 1 | UP | 1 | | REFERENCE PIN 1 UP 1 COMMON INTERLOCK 1 |
| 003 | ILCM2 | PI | 1 | UP | 1 | | REFERENCE PIN 1 UP 1 COMMON INTERLOCK 2 |
| 003 | ILCM3 | PI | 1 | UP | 1 | | REFERENCE PIN 1 UP 1 COMMON INTERLOCK 3 |
| 003 | PB | PI | 1 | UP | 1 | | REFERENCE PIN 1 UP 1 PUSH BUTTON |
| 003 | CR | PI | 1 | DW | 1 | | REFERENCE PIN 1 DOWN 1 INSTRUCTION |
| 003 | CR | PI | 1 | UP | 1 | | REFERENCE PIN 1 UP 1 INSTRUCTION |
| 003 | SV | PI | 1 | UP | 1 | | REFERENCE PIN 1 UP 1 OUTPUT |

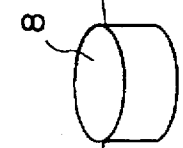

| BLOCK NO. | LABEL | | | ACTION | ACTION NO. | SUB | ACTUAL ADDRESS | COMMENT 1 | COMMENT 2 | COMMENT 3 |
|---|---|---|---|---|---|---|---|---|---|---|
| | DEVICE | MECHANISM | MECHANISM NO. | | | | | | | |
| 001 | SV | CO | 1 | FW | 1 | | Y100 | | | |
| 001 | LS | CO | 1 | FW | 1 | | X000 | | | |
| 001 | ILST | ST | 1 | OP | 1 | | M0 | STOPPER 1 OPEN 1 ACTIVATING CONDITION | | |
| 001 | LS | BA | 1 | FW | 1 | | X008 | | INTERLOCK | |
| 001 | ILAT | ST | 1 | OP | 1 | | M1 | STOPPER 1 OPEN 1 AUTOMATIC | | |
| 001 | LS | LF | 1 | UP | 1 | | X005 | | | |
| 001 | LS | PI | 1 | UP | 1 | | X004 | | | |
| 001 | LS | LF | 1 | DW | 1 | | X001 | | INTERLOCK | |
| 001 | ILMN | ST | 1 | OP | 1 | | M2 | STOPPER 1 OPEN 1 MANUAL | | |
| 001 | LS | LF | 2 | DW | 1 | | X006 | | INTERLOCK | |

| 002 | ILST | LF | 1 | UP | 1 | M10 | LIFTER 1 UP 1 ACTIVATING INSTRUCTION | |
|---|---|---|---|---|---|---|---|---|
| 002 | ILAT | LF | 1 | UP | 1 | M11 | LIFTER 1 UP 1 AUTOMATIC | INTERLOCK |
| 002 | ILMN | LF | 1 | UP | 1 | M12 | LIFTER 1 UP 1 MANUAL | INTERLOCK |
| 002 | IL | ROB | 1 | OP | 1 | X018 | | |
| 002 | ILCM1 | LF | 1 | UP | 1 | M13 | LIFTER 1 UP 1 COMMON | INTERLOCK 1 |
| 002 | ILCM2 | LF | 1 | UP | 1 | M14 | LIFTER 1 UP 1 COMMON | INTERLOCK 2 |
| 002 | IL | ROB | 1 | OP | 1 | X018 | | |
| 002 | ILCM3 | LF | 1 | UP | 1 | M15 | LIFTER 1 UP 1 COMMON | INTERLOCK 3 |
| 002 | PB | LF | 1 | UP | 1 | X202 | LIFTER 1 UP 1 PUSH BUTTON | |
| 002 | — | | | | | | | |
| 002 | CR | LF | 1 | DW | 1 | M203 | LIFTER 1 DOWN 1 INSTRUCTION | |
| 002 | CR | LF | 1 | UP | 1 | M202 | LIFTER 1 UP 1 COMMON | |

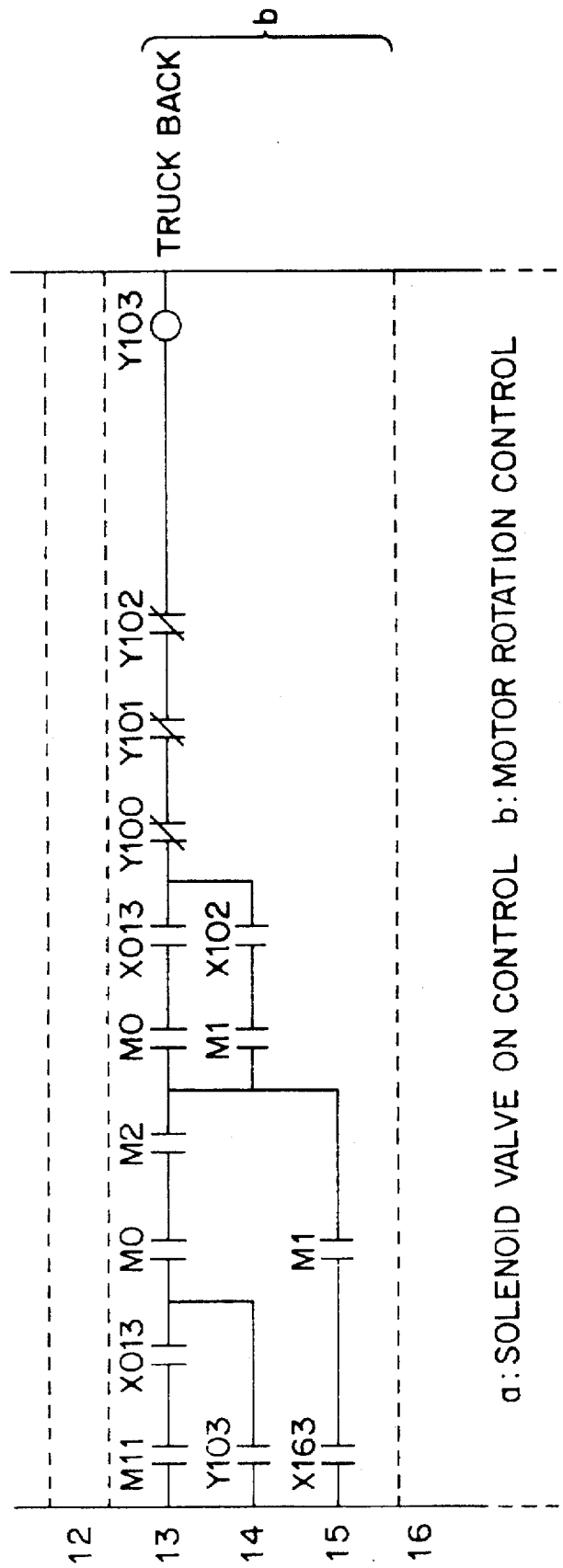
F I G. 25
a: SOLENOID VALVE ON CONTROL   b: MOTOR ROTATION CONTROL

PROGRAMMING SYSTEM

BACKGROUND OF THE INVENTION

1. Field of the Invention

This invention relates to a programming system for preparing a sequence program for a sequence control unit comprising a hardware sequence control unit formed by relays and the like, a software sequence control unit using PLCs (programmable logic controller) and the like or a combination of such a hardware sequence control unit and a software sequence control unit.

2. Description of the Related Art

In productive facilities for producing industrial products such as machines, there has been wide use a hardware sequence control unit formed by relays and the like, a software sequence control unit using PLCs (programmable logic controller) and the like or a hybrid sequence control unit, i.e., a combination of a hardware sequence control unit and a software sequence control unit in order to automate the productive facilities.

An example of sequence control of a truck conveyor system comprising an electric motor 102 for moving a truck 101 back and forth in the directions of double-headed arrow X1, an air cylinder 103 for moving a lifter 104 up and down in the directions of double-headed arrow X2, a solenoid valve 105 for controlling air to the air cylinder 103 and an air circuit 106 as shown in FIG. 22 is shown in FIG. 23.

When the motor 102 rotates in a regular direction, the truck 101 is moved forth (leftward as seen in FIG. 22) and when the motor 102 rotates in the reverse direction, the truck 101 is moved back (rightward as seen in FIG. 22). The solenoid valve 105 has a solenoid SOLA-a and a solenoid SOLA-b, and when the solenoid SOLA-a is energized, the air cylinder 103 is driven to move upward the lifter 104 and when the solenoid SOLA-b is energized, the air cylinder 103 is driven to move downward the lifter 104.

In the example shown in FIG. 23, some other control is executed in step #1, and steps #2 to #5 are subsequently executed in sequence. That is, the solenoid SOLA-a is turned on to move upward the lifter 104 in step #2, the motor 102 is rotated in the regular direction to move forth the truck 101 in step #3, the solenoid SOLA-b is turned on to move downward the lifter 104 in step #4 and then the motor 102 is rotated in the reverse direction to move back the truck 101 in step #5. Thereafter some other control is executed in step #6.

FIGS. 24 and 25 show an example of a ladder type sequence program for executing the control described above.

Recently as the functions of the programmable logic controller increases and the data processing performance is improved, the sequence control of the productive facilities has been diversified and multi-functionalized, and accordingly the sequence program for the sequence control unit has become complicated and preparation of the sequence program has come to require large labor in any of the hardware-type, software-type and hybrid-type sequence control units.

Various programming systems or methods for simplifying and facilitating preparation of a program for a sequence control unit have been proposed. For example, see Japanese Unexamined Patent Publication No. 1(1989)-204104. In the programming system (programmable controller) disclosed in the patent publication, control factors, addresses, symbolic instructions and the like forming a sequence program are stored in a memory, and when an operator inputs a control factor prior to execution of the sequence program, information corresponding to the control factor stored in the memory is called and shown on a display, whereby debug of the sequence program is facilitated.

In the conventional method of preparing a sequence program, preparation of a sequence program is simplified and facilitated by manually ordering and standardizing a sequence program (FIGS. 24 and 25) corresponding a series of actions (FIG. 23) of a unit such as shown in FIG. 22. That is, when a similar sequence program is to be prepared for a unit similar to the unit shown in FIG. 22, the sequence program is prepared by fetching (extracting or selecting) the standardized sequence program, and referring to, editing or correcting the standardized sequence program according to the new sequence program to be prepared.

An example of sequence control of a truck conveyor system which has, in addition to the components of the system shown in FIG. 22, a slide 108 carrying thereon the air cylinder 103 for the lifter 104 and slidable back and forth in the directions of double-headed arrow X3, an air cylinder 107 for sliding back and forth the slide 108, a solenoid valve 109 for controlling air to the air cylinder 107 and an air circuit 110 as shown in FIG. 26 is shown in FIG. 27.

The solenoid valve 109 has a solenoid SOLB-a and a solenoid SOLB-b, and when the solenoid SOLB-a is energized, the air cylinder 107 is driven to move forth the slide 108 and when the solenoid SOLB-b is energized, the air cylinder 107 is driven to move back the slide 108.

In the example shown in FIG. 27, some other control is executed in step #11, and steps #12 to #17 are subsequently executed in sequence. That is, the solenoid SOLA-a is turned on to move upward the lifter 104 in step #12, the solenoid SOLB-a is turned on to move forth the slide 108 in step #13, the motor 102 is rotated in the regular direction to move forth the truck 101 in step #14, the solenoid SOLA-b is turned on to move downward the lifter 104 in step #15, the solenoid SOLB-b is turned on to move back the slide 108 in step #16 and then the motor 102 is rotated in the reverse direction to move back the truck 101 in step #17. Thereafter some other control is executed in step #18.

FIGS. 28 and 29 show an example of a ladder type sequence program for executing the control described above.

In the conventional method of preparing a sequence program, preparation of a sequence program is simplified and facilitated by manually ordering and standardizing a sequence program (FIGS. 28 and 29) corresponding a series of actions (FIG. 27) of a unit such as shown in FIG. 26 in the manner similar to that illustrated above in conjunction with the system shown in FIG. 22. That is, when a similar sequence program is to be prepared for a unit similar to the unit shown in FIG. 26, the sequence program is prepared by fetching (extracting or selecting) the standardized sequence program, and referring to, editing or correcting the standardized sequence program according to the new sequence program to be prepared.

However, the conventional method in which the sequence programs for two truck conveyor systems, for instance, those shown in FIGS. 22 and 26, are separately standardized is disadvantageous in the following points.

(1) Problems in Preparation of Sequence Programs

In the conventional method, there has been a problem that a lot of manhours are required to prepare the sequence program and at the same time a lot of errors can occur due to mistake of the operator since the conventional method is dependent upon man labor. Further since the standardized sequence program can be applied only to a limited range, it is often the case that even a sequence program for a similar system must be created all along.

Manhours required to prepare the sequence program includes fetching the standardized sequence program (extraction or selection), editing the relay numbers in the sequence program and the numbers of input/output relays, internal relays and the data registers and the like in the PLC, comment input and assembly of standardized sequence program.

The errors which are apt to occur due to mistake of the operator include mistake in fetching the standardized sequence program (mis-selection or mis-extraction) including omission in extraction or selection, mistake in editing the relay numbers in the sequence program and the numbers of input/output relays, internal relays and the data registers and the like in the PLC, sequence error in assembly of the standardized sequence program and mistake in designing in newly designed part.

(2) Problems in Management of Standardized Sequence Programs

In the aforesaid two examples, the standardized sequence program prepared for the system shown in FIG. 22 differs from that for the system shown in FIG. 26 only in that there is an action of the slide 108 in the latter sequence program and they are overlap with each other in the major part. Accordingly when both the standardized sequence programs are stored in the memory, the memory must store two pieces of information which are the same, which requires an unnecessarily large storage capacity. That is, in the conventional method, since the sequence program is standardized with a series of actions employed as a unit, the standardized sequence programs necessarily include an overlapping part and as a result it becomes difficult to make the best use of the storage capacity of the memory.

SUMMARY OF THE INVENTION

In view of the foregoing observations and description, the primary object of the present invention is to simplify and facilitate preparation of sequence programs while preventing error in preparation of the sequence program due to mistake of the operator.

The programming system of the present invention can be applied to any one of a hardware sequence control unit, a software sequence control unit and a hybrid sequence control unit and is characterized in that sequence programs are all prepared from standardized control circuits as units without affected by the overall function and/or control characteristics of the system or facilities to be controlled.

That is, the programming system of the present invention is for preparing a sequence program for controlling a predetermined system, which sequence program is formed by a plurality of contacts and/or windings each given an actual address representing a name of a mechanism such as a truck, a lifter, a slide or the like which forms the system and the action of which is to be controlled, a name of an action of the mechanism and a name of a controlled device such as a switch, a solenoid valve, a motor and the like which is directly controlled to control the action of the mechanism, and comprises a standardized control circuit holding means which holds a plurality of standardized control circuits each formed by a plurality of contacts and/or windings each given a variable label representing a name of a mechanism which forms a system and the action of which is to be controlled, a name of an action of the mechanism and a name of a controlled device which is directly controlled to control the action of the mechanism, a standardized control circuit editing means which fetches from the standardized control circuit holding means a plurality of standardized control circuits designated according to sequence control characteristics of said predetermined system and edits the standardized control circuits, thereby creating a first transitional sequence program formed by contacts and/or windings each given a variable label, a first label converting means which converts each of the variable labels in the first transitional sequence program into a fixed label which corresponds to the name of the mechanism to be controlled by each of the standardized control circuits and the designated action thereof, thereby creating a second transitional sequence program and a second label converting means which converts each of the fixed labels in the second transitional sequence program into an actual address on the basis of a table representing correspondence between the fixed labels and actual addresses, thereby finishing a sequence program for said predetermined system.

In accordance with the present invention, a first transitional sequence program in which each contact or winding is given a variable label is created by designating or selecting standardized control circuits corresponding to the desired actions of the mechanisms forming the system to be controlled, and a second transitional sequence program in which each contact or winding is given a fixed label is created by designating the names of the mechanisms and the actions thereof, and a sequence program in which each contact or winding is given an actual address is created on the basis of a table representing correspondence between the fixed labels and the actual addresses. Accordingly preparation of the sequence program is simplified and facilitated and at the same time, error in preparation of the sequence program due to mistake of the operator is prevented or reduced. Further since the standardized control circuit is set by mechanism or by component of the system, overlapping between the standardized control circuits is almost nullified.

In one embodiment of the present invention, the first label converting means gives a comment representing the contents of control of each standardized control circuit to the second transitional sequence program when the first label converting means converts the variable labels to the fixed labels.

With this arrangement, since the comment representing the contents of control of each standardized control circuit is displayed on the sequence program, the contents of the sequence program can be easily grasped.

In another embodiment of the present invention, each standardized control circuit is created for a minimum unit device such as a solenoid valve, a motor or the like which is directly controlled by the sequence program to control a mechanism such as a truck, a lifter, a slide or the like whose action is to be controlled.

With this arrangement, overlapping between the standardized control circuits is further reduced and accordingly the storage capacity of the standardized control circuit holding means may be smaller.

It is preferred that each standardized control circuit comprises a control circuit part related to a basic control of the device and an argument part related to external factors.

It is preferred that the external factors include the timing of activation of the control circuit and the condition of interlock for preventing interference between systems.

With this arrangement, since the external factors such as the timing of activation of the standardized control circuit and the condition of interlock can be displayed in the argument part, programs for the mechanisms different in the external factors can be prepared by use of the same standardized control circuit.

It is preferred that the first label converting means converts the variable labels in the first transitional sequence program into the fixed labels separately by standardized control circuit.

With this arrangement, programming can be effected efficiently.

Further it is preferred that file codes of the standardized control circuits, device name labels, mechanism name labels and action name labels are respectively stored in data bases.

With this arrangement, retrieval of data is facilitated.

BRIEF DESCRIPTION OF THE DRAWINGS

FIG. 2 is a view showing data stored in the standardized circuit index data base, FIG. 5 is a view showing data stored in the device name-label symbol mapping data base, FIG. 9 is a view showing an example of a block flow creation screen of the programming system, FIG. 14 is a view similar to FIG. 9 but in which the action name display window is displayed, FIG. 17 is a view showing the other part of the label-actual address table before the actual addresses are set, FIG. 25 is a view showing the other part of the ladder sequence program corresponding to the sequence control shown in FIG. 23.

DESCRIPTION OF THE PREFERRED EMBODIMENT

As shown in FIGS. 1 to 5, a programming system in accordance with an embodiment of the present invention is an information processing system comprising first to ninth magnetic memories 1 to 9 and is for simplifying and facilitating preparation of sequence programs for various productive facilities as well as preventing error in preparation of the sequence program due to mistake of the operator.

The basic concept in preparation of the sequence program in the programming system of this embodiment will be described first, hereinbelow.

Figure 28:
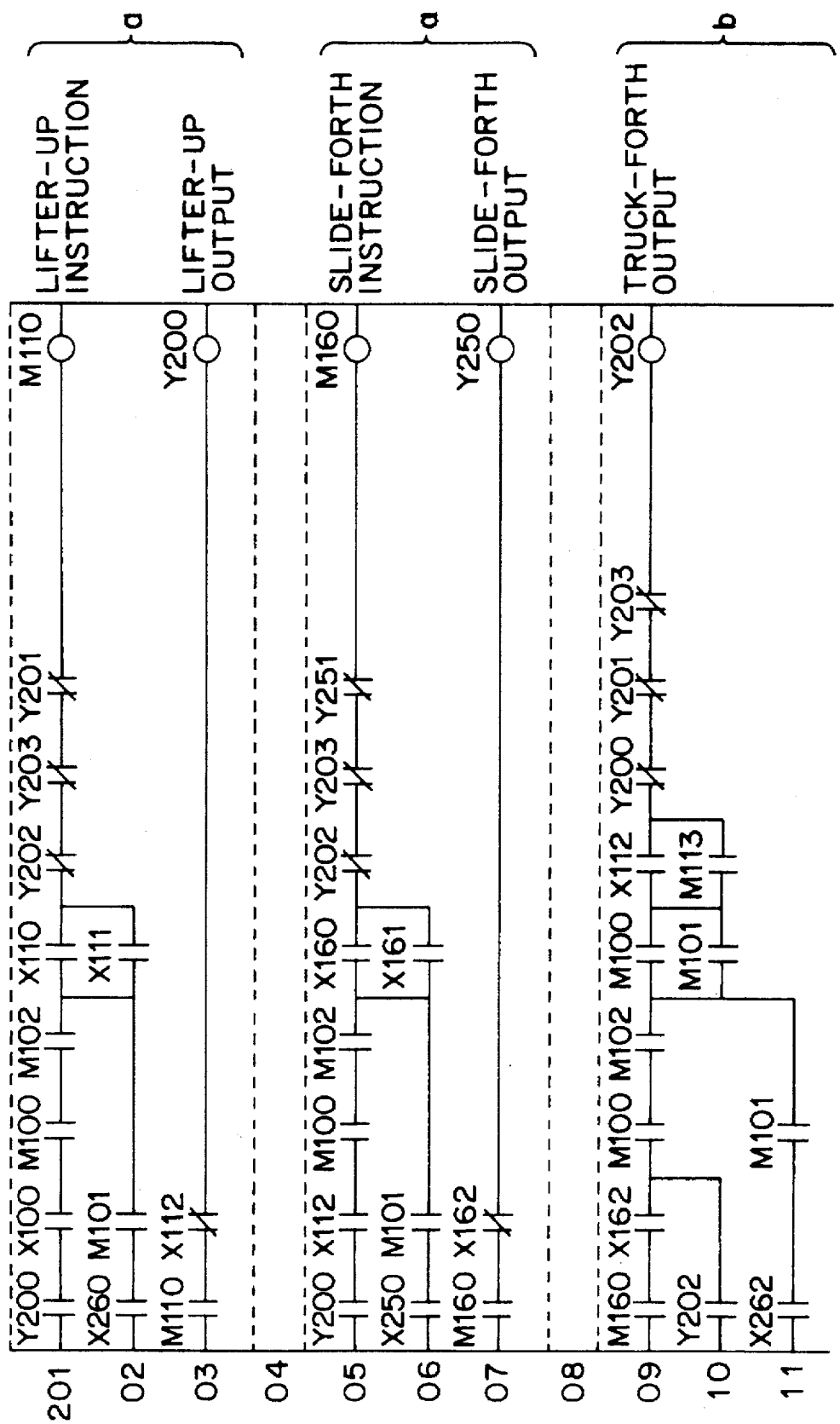
FIG. 28 is a view showing a part of a ladder sequence program corresponding to the sequence control shown in FIG. 27.
Figure 29:
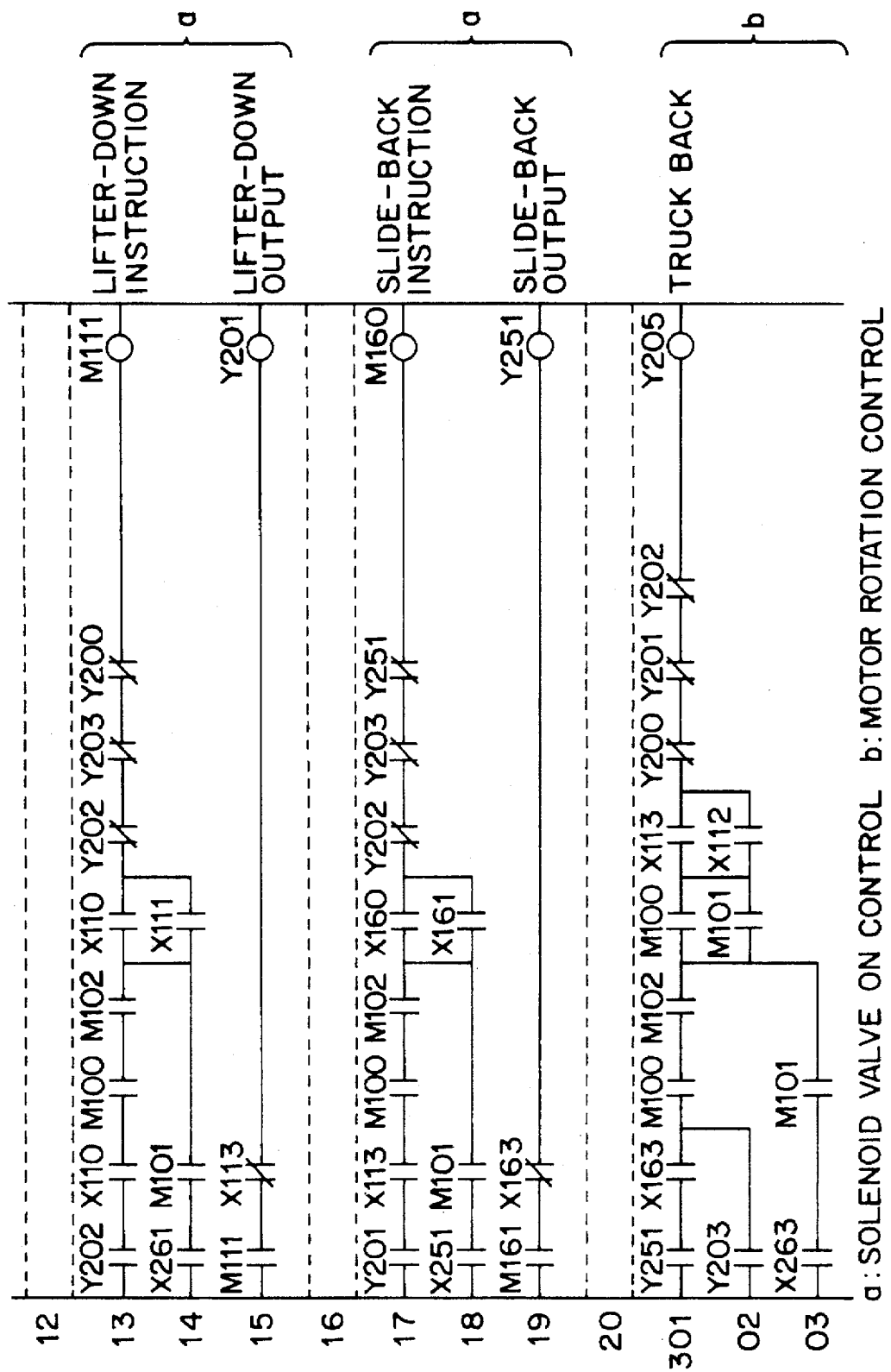
FIG. 29 is a view showing the other part of the ladder sequence program corresponding to the sequence control shown in FIG. 27.

For example, in the sequence control (FIGS. 23 to 25) for the truck conveyor system with a lifter shown in FIG. 22 (will be referred to as "the first truck conveyor system", hereinbelow) and that (FIGS. 27 to 29) for the truck conveyor system with a lifter and a slide shown in FIG. 26 (will be referred to as "the second truck conveyor system", hereinbelow), any one of the lifter-up control, the lifter-down control, the slide-forth control and the slide-back control is effected through a solenoid valve on-off circuit and either of the slide-forth control and the slide-back control is effected through a motor on-off circuit.

In accordance with this embodiment, a partial sequence program or a partial control circuit (will be referred to as "a unit control circuit", hereinbelow) for a minimum unit controlled object such as a solenoid valve, a motor or the like which is directly controlled by the sequence program to control a mechanism such as a truck, a lifter, a slide or the like whose action is to be controlled is standardized. A plurality of such standardized unit control circuits are stored in a memory to build a data base, and when a sequence program for a similar system is to be prepared, the standardized unit control circuit is called out and used as required, whereby manhours required to prepare the sequence program is reduced and error due to mistake of the operator is reduced. The method of the present invention is realized by employing a concept of a variable label and a fixed label which has not been employed in the conventional programming method.

As can be understood from the description above, in accordance with this embodiment, since standardized unit control circuits for minimum unit controlled objects which hardly overlap with each other are stored in the memory, the memory may be very small in the storage capacity. When it is desired that a control circuit for a series of actions (will be referred to as "a combined control circuit", hereinbelow) is standardized to form a standardized combined control circuit, the standardized combined control circuit can be formed as a combination or a permutation of standardized unit control circuits. With this arrangement, the standardized combined control circuit can be modified by modifying only the standardized unit control circuit corresponding to the part to be modified, whereby modification of the program can be simplified and facilitated.

In accordance with the present invention, a controlled object, i.e., a system or a facility to be sequence-controlled, is divided into minimum unit controlled objects such as actuators (a solenoid, a motor and the like) and unit instruments (a monitor and the like) forming the controlled object, and also the sequence program is divided into units.

Figure 22:
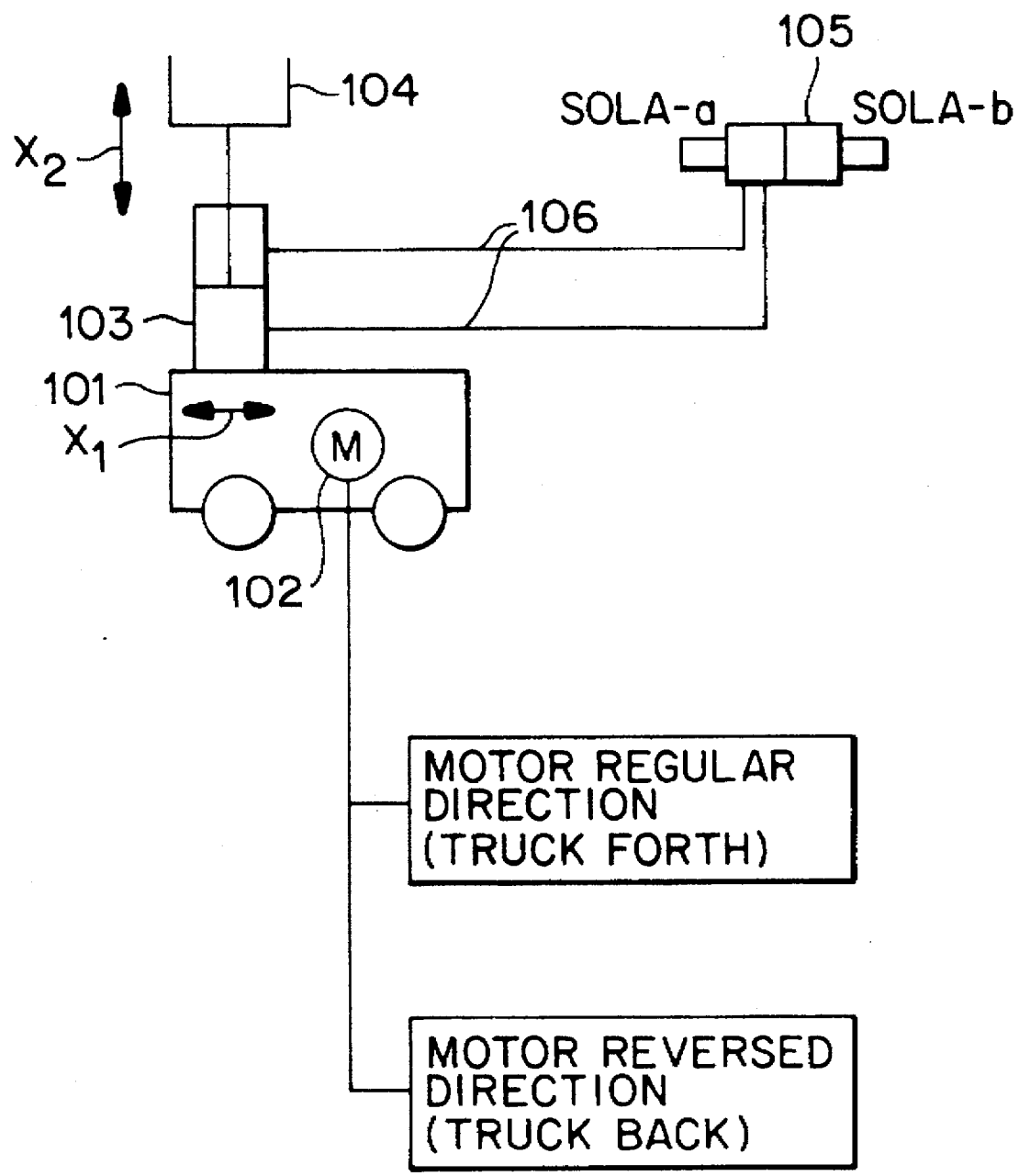
FIG. 22 is a schematic view of a truck conveyor system with lifter to be sequence-controlled.
Figure 26:
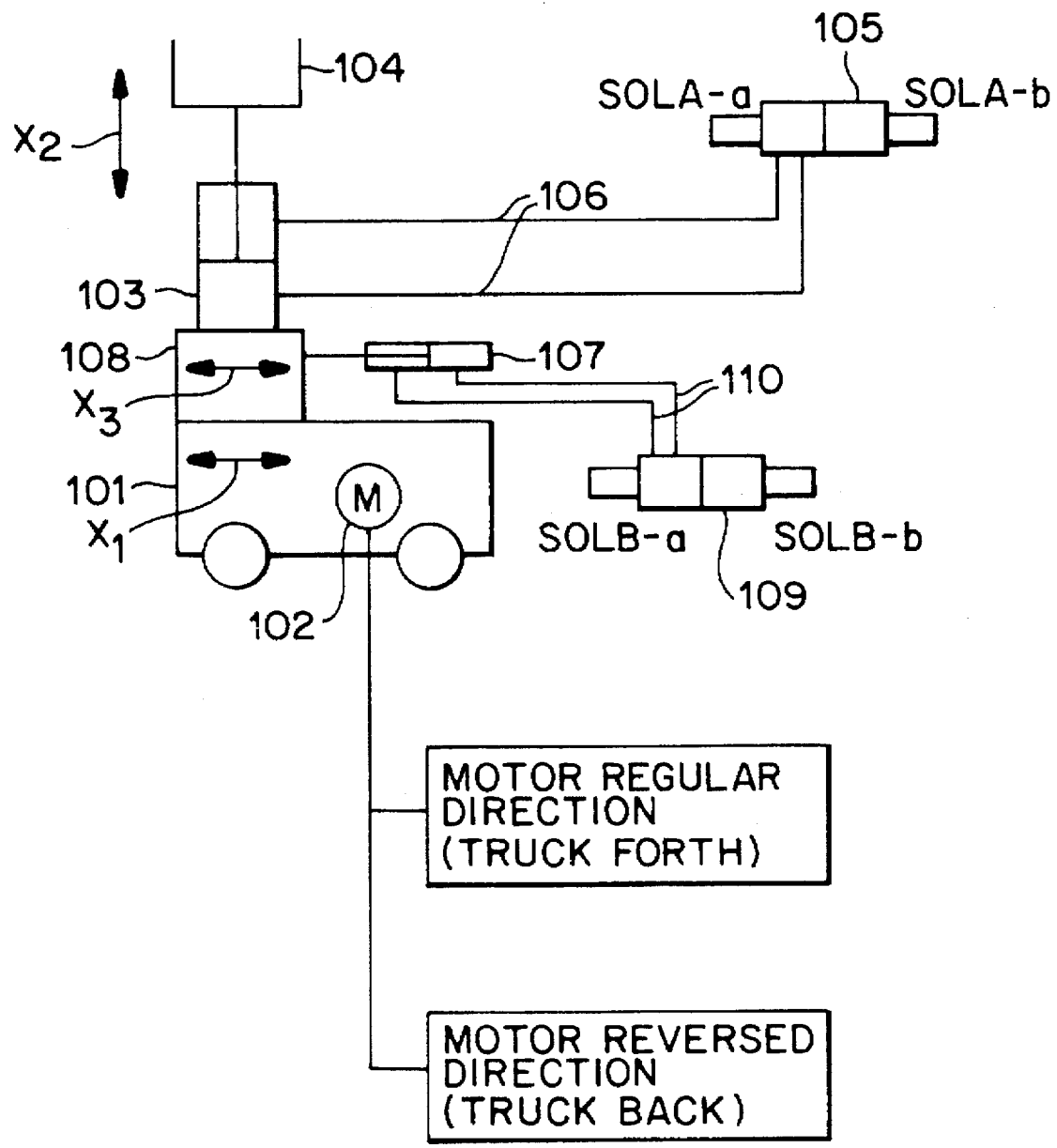
FIG. 26 is a schematic view of a truck conveyor system with lifter and slide to be sequence-controlled.

For example, in the case of the first truck conveyor systems shown in FIGS. 22 and 26, both the systems have the truck 101 which is moved back and forth by the motor 102 (a minimum unit controlled object) and the lifter 103 which is moved up and down by the air cylinder 103 and the solenoid valve 105 (a minimum unit controlled object). The second truck conveyor system is further provided with the slide 108 which is moved back and forth by the air cylinder 107 and the solenoid valve 109 (a minimum unit controlled object).

Figure 23:
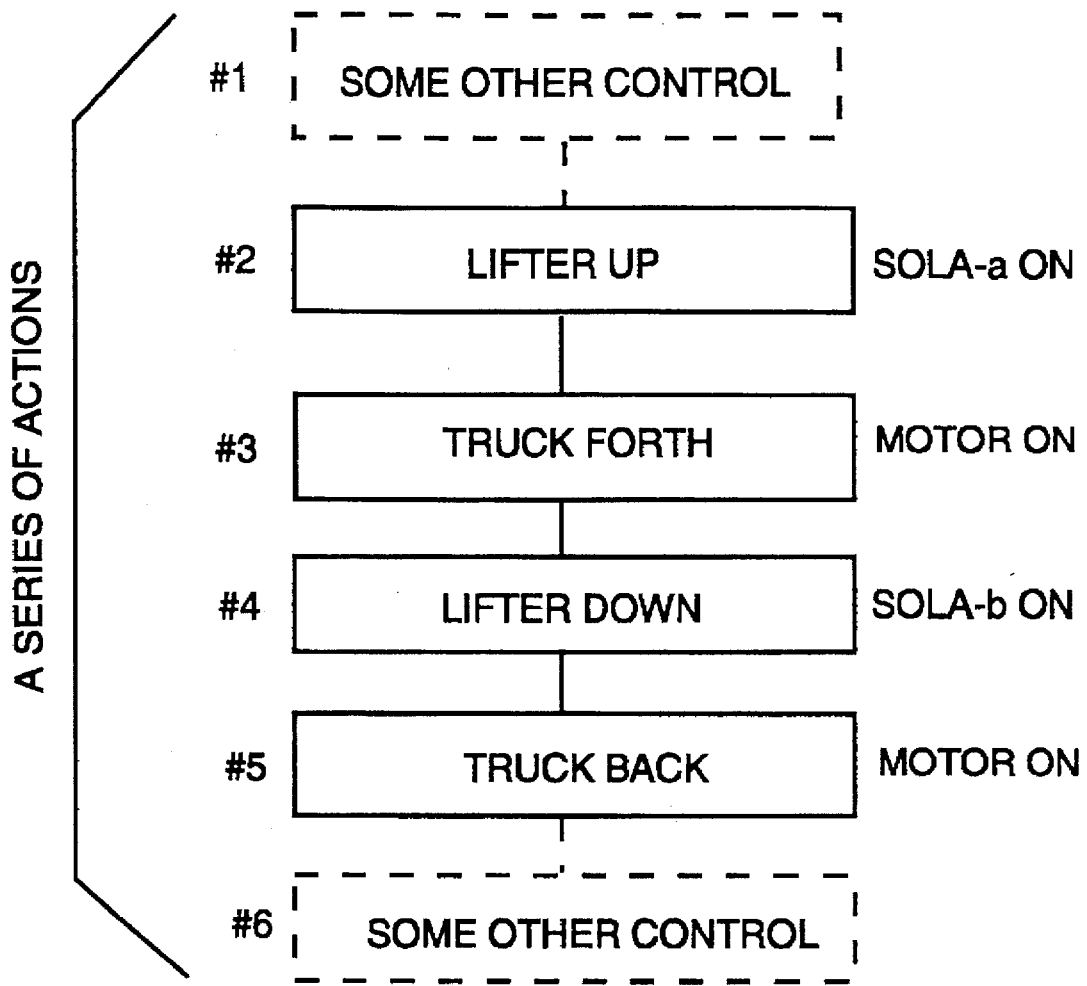
FIG. 23 is a flow chart for illustrating the procedure of sequence-controlling the truck conveyor system shown in FIG. 22.
Figure 24:
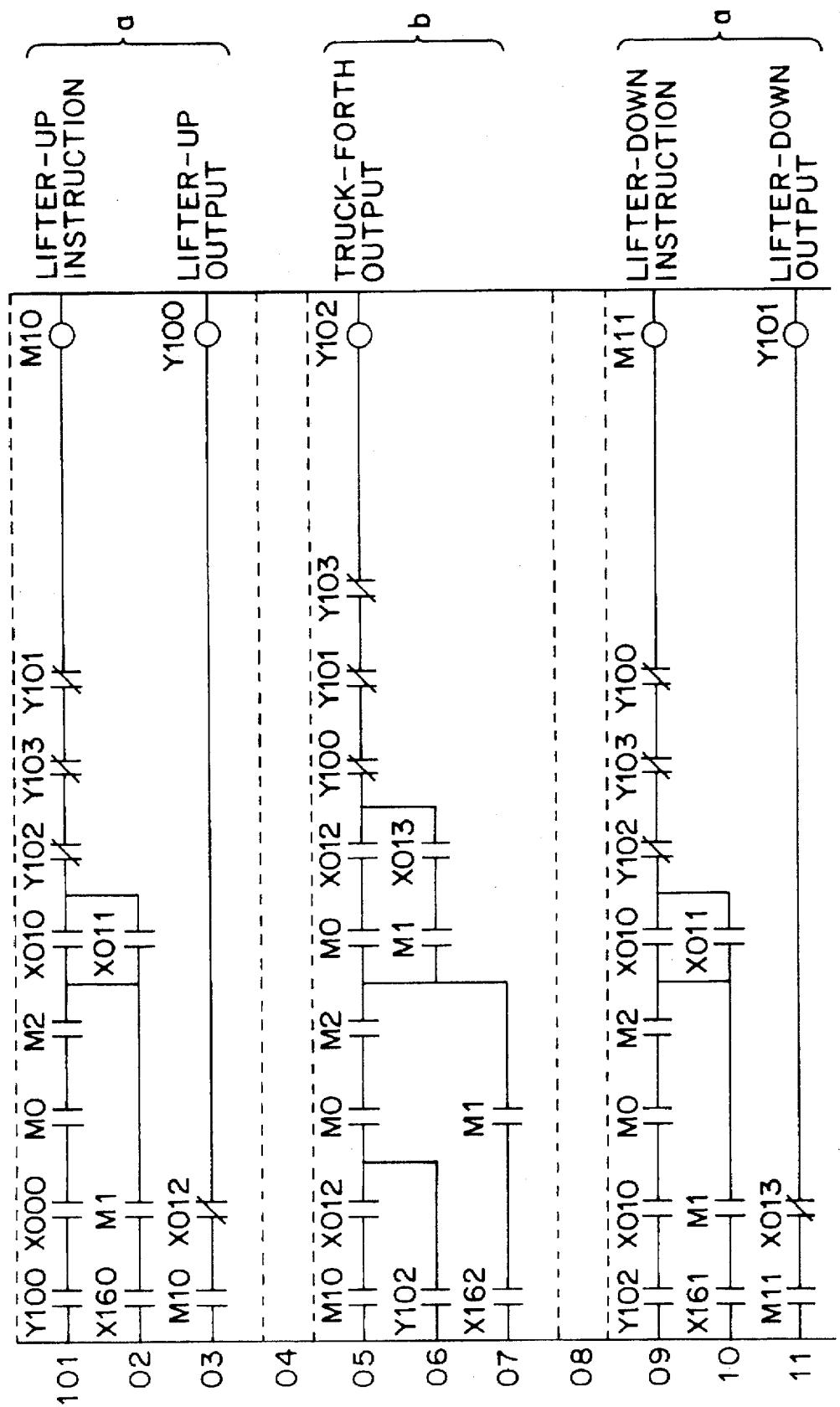
FIG. 24 is a view showing a part of a ladder sequence program corresponding to the sequence control shown in FIG. 23.
Figure 27:
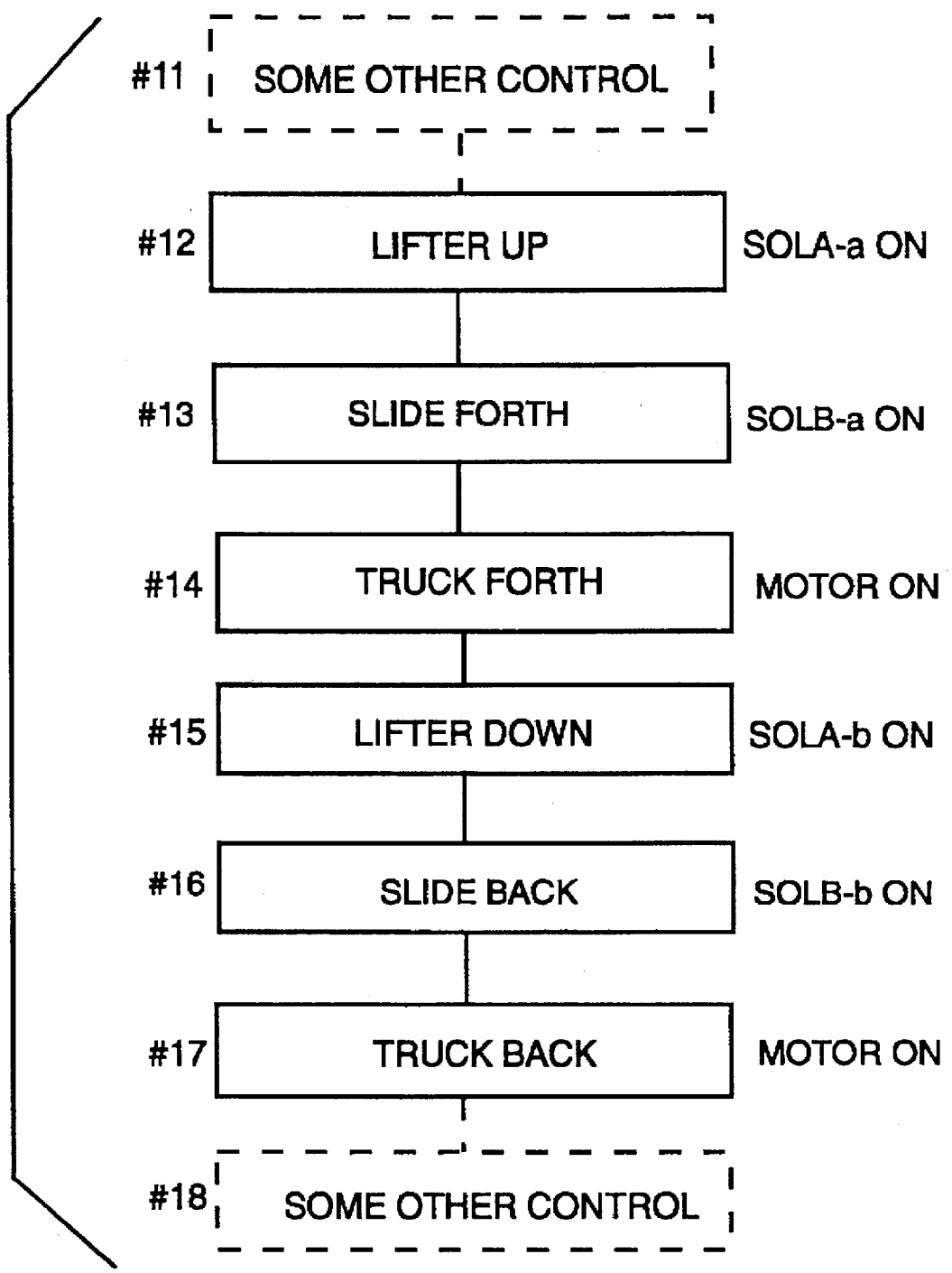
FIG. 27 is a flow chart for illustrating the procedure of sequence-controlling the truck conveyor system shown in FIG. 26.

As can be understood from the flow charts shown in FIGS. 23 and 27, control of each truck conveyor system is formed by two kinds of unit control, i.e., solenoid valve control and motor control. The control circuit for performing each unit control is the aforesaid unit control circuit.

The sequence programs formed by the actual unit control circuits for performing the unit controls are shown in FIGS. 24 and 25 and FIGS. 28 and 29. Each of the sequence programs is formed by combination of two kinds of unit control circuit, unit control circuit a for the solenoid valve control and unit control circuit b for the motor control. The unit control circuits of a kind, e.g., the unit control circuit a, are distinct from each other by difference in operating conditions such as the timing of activation, the condition of interlock and the like (the presence or absence of a contact) or difference in actual addresses represented, for instance, by X000 or Y100. However by conforming such a difference in the following manner, a plurality of unit control circuits of a kind can be handled as a standardized unit control circuit.

(1) Method of Conforming the Difference in Operating Conditions of the Respective Unit Control Circuits (the Presence or Absence of a Contact)

The difference in operating conditions (the presence or absence of a contact) is mainly depends upon external factors such as the timing of activation of the unit control circuit, the condition of interlock for preventing interference between the systems and the like. Accordingly, in the standardized unit control circuit, the basic part representing the function of the unit control circuit all its own is separated from the part depending upon such external factors so that only the external factors have to be taken into account when preparing a program.

(2) Method of Conforming the Difference in the Actual Addresses

The actual address is given in order to distinguish the mechanism such as a lifter, a slide and a truck whose action is to be controlled, to distinguish the action of the mechanism such as up, down, forward movement, rearward movement, and the like, and to distinguish a controlled device such as a switch, a solenoid valve, a motor and the like which is directly controlled to control the action of the mechanism. Generally the actual address is just one and inherent to each system. That is, basically the same actual address is not given to different controlled devices, different mechanisms, or different actions.

However since the standardized unit control circuits are used to prepare various sequence programs, actual addresses cannot be given to controlled devices, mechanisms and actions in the standardized unit control circuits. Accordingly, in the present invention, a concept of a variable label and a fixed label to be described later is introduced to temporarily distinguish devices, mechanisms and actions and the labels are converted into actual addresses when the program is finished.

Figure 6:
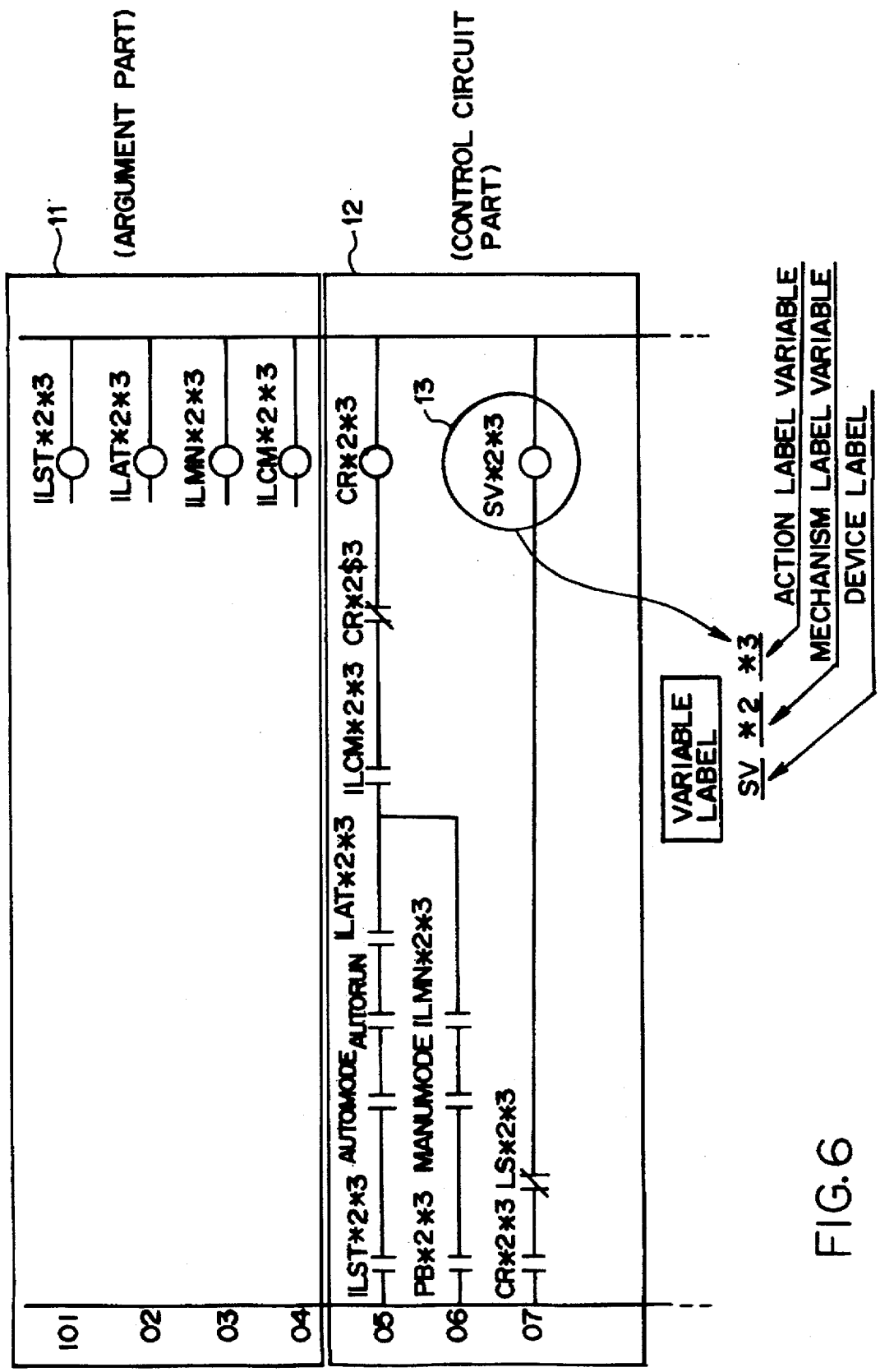
FIG. 6 is a view showing an example of a standardized unit control circuit.
Figure 7:
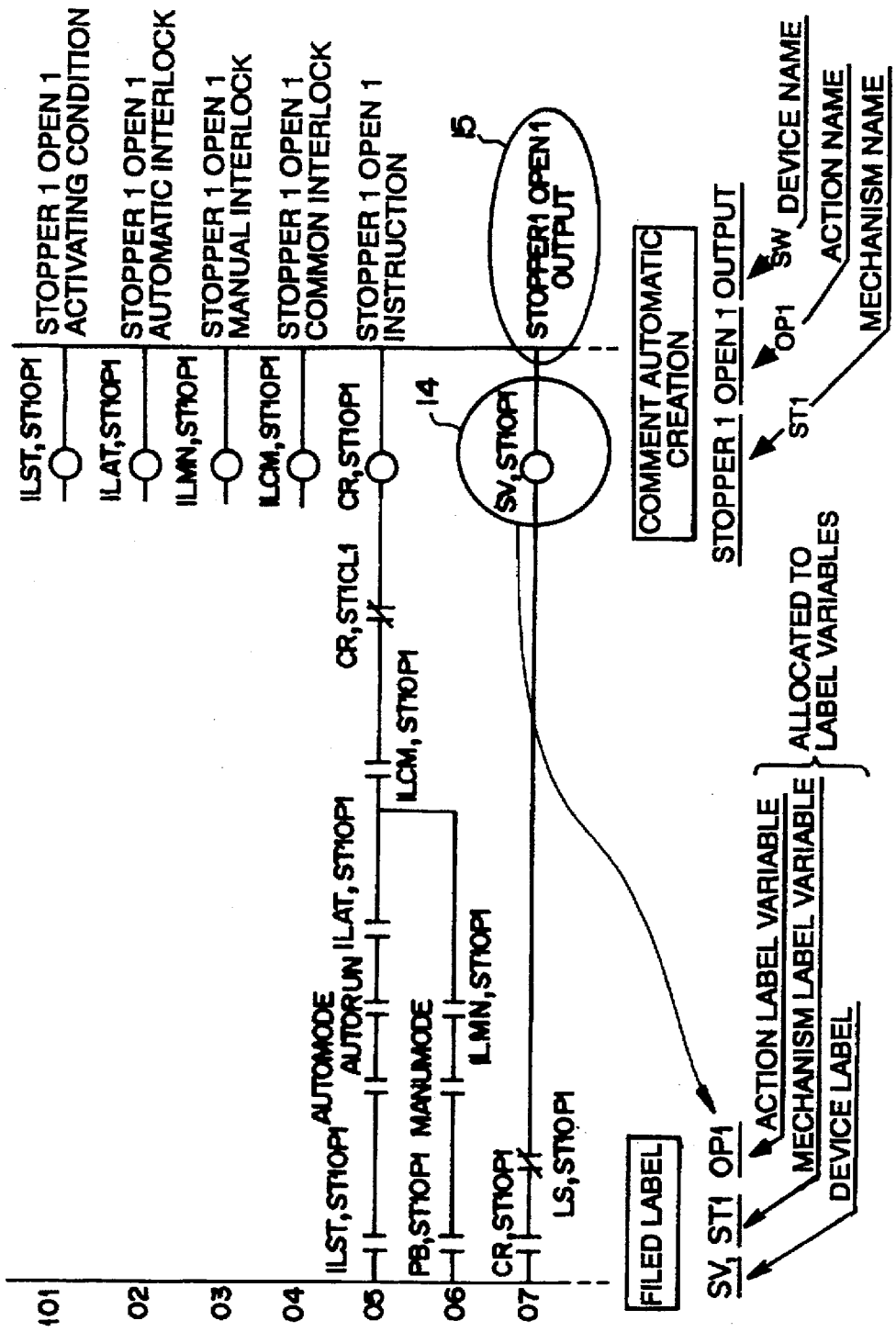
FIG. 7 is a view showing a transitional unit control circuit (sequence program) in which the variable labels have been converted into the fixed labels.
Figure 8:
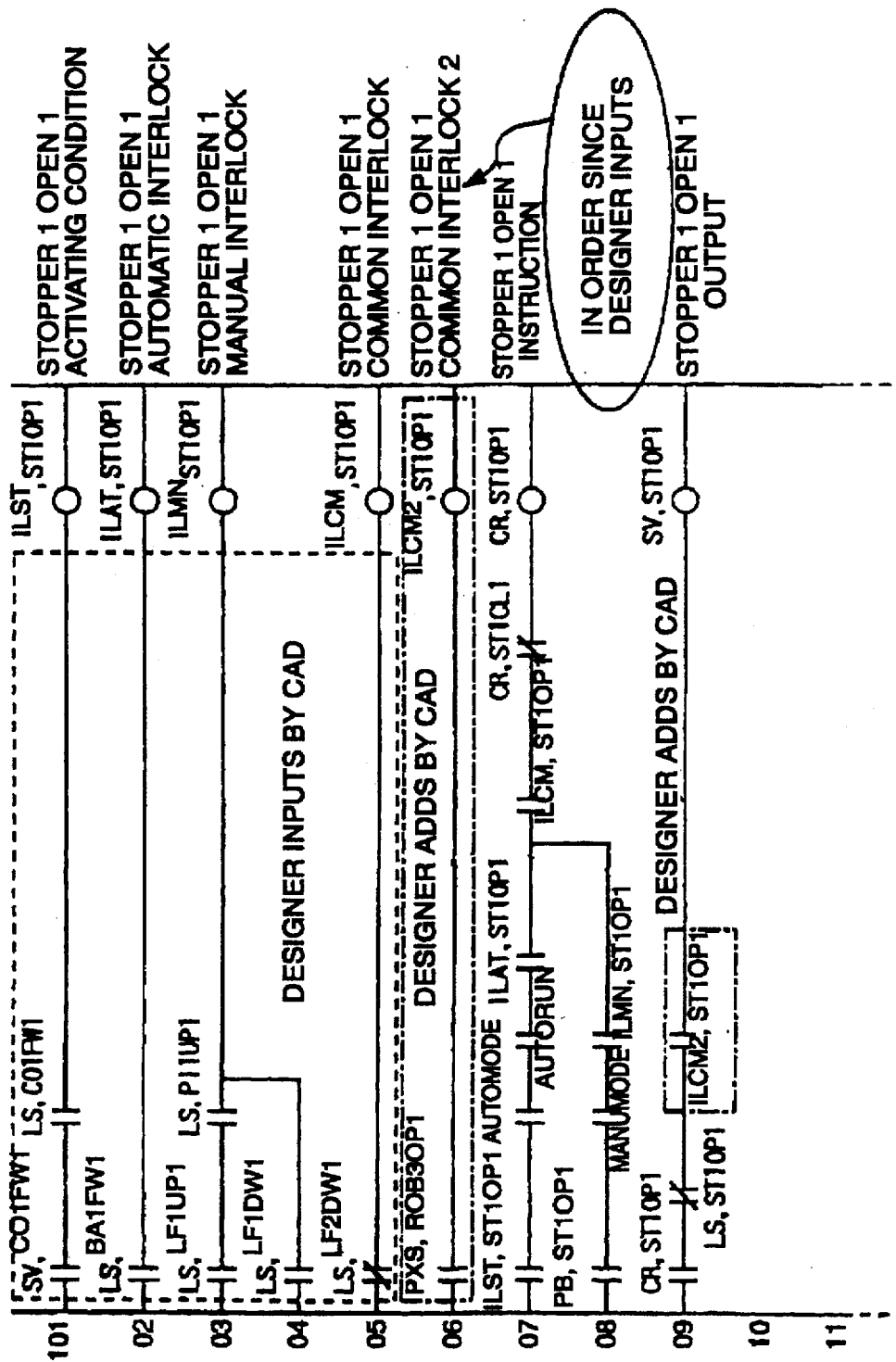
FIG. 8 is a view showing a transitional unit control circuit (sequence program) in which external factors have been input.
Figure 20:
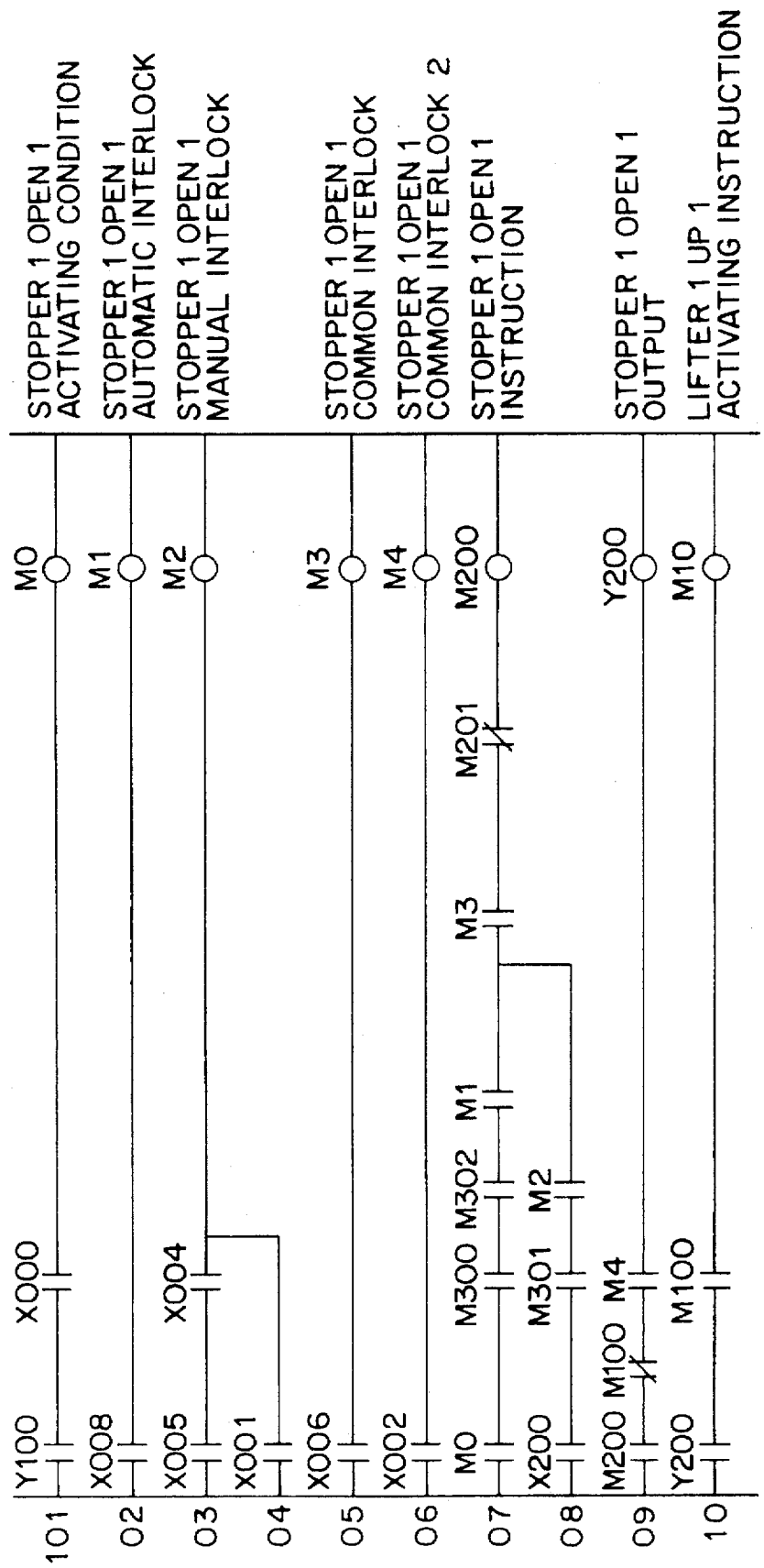
FIG. 20 is a view showing a part of the finished sequence program.
Figure 21:
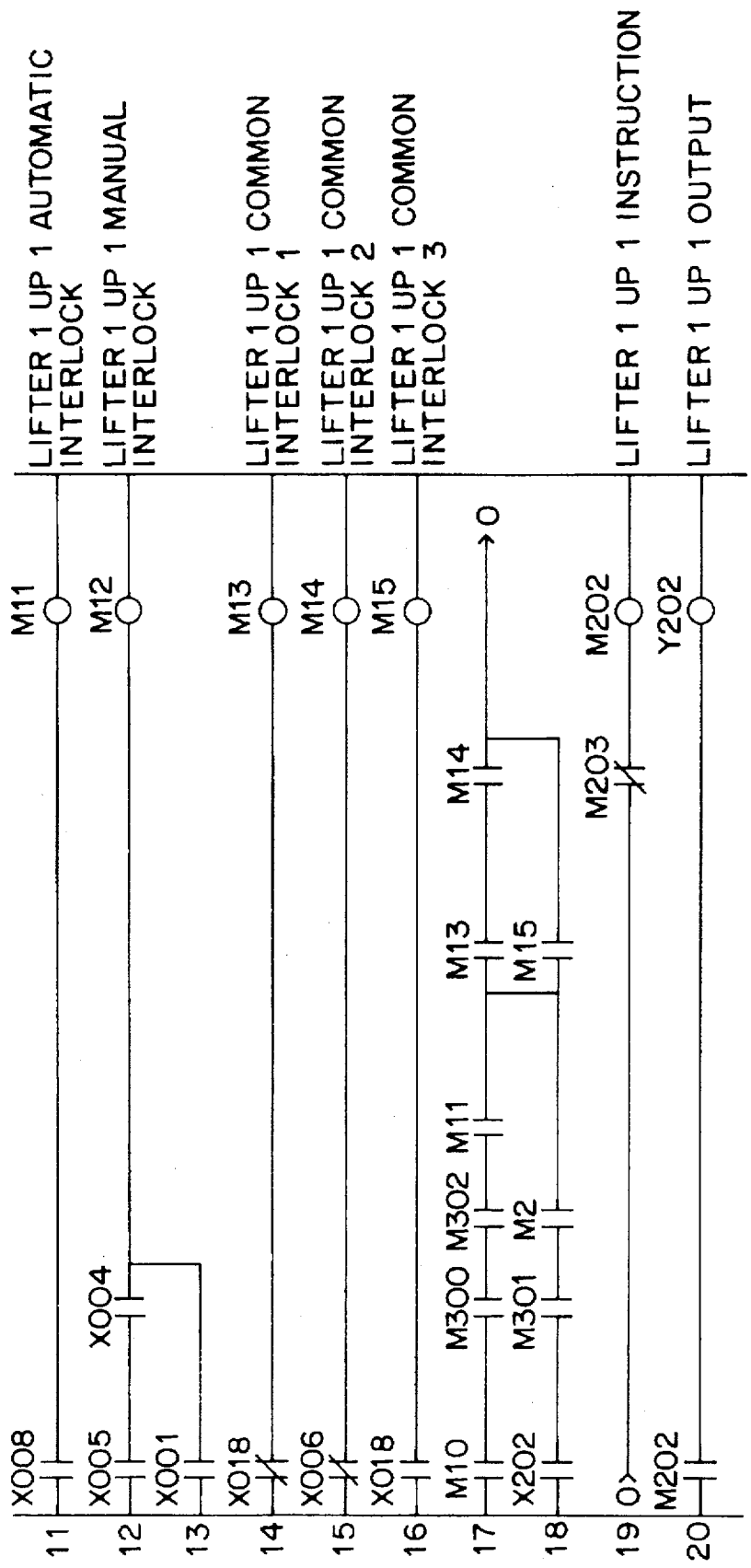
FIG. 21 is a view showing the other part of the finished sequence program.

FIG. 6 shows an example of a standardized unit control circuit in which each contact or winding is given an inherent variable label. As will be described in detail later, the standardized unit control circuit is converted, by a first compiler, into a transitional unit control circuit (sequence program) in which each contact or winding is given an inherent fixed label as shown in FIGS. 7 and 8, and then converted, by a second compiler, into a final sequence program in which each contact or winding is given an inherent actual address as shown in FIGS. 20 and 21.

As shown in FIG. 6, the standardized unit control circuit comprises a pair of parts, an argument part 11 and a control circuit part 12. External factors such as the timing of activation of the unit control circuit, the condition of interlock for preventing interference between the systems and the like are mainly input into the argument part 11. The control circuit part 12 is a basic part which is for driving the mechanism to be controlled and is not related to the external factors.

As can be seen from FIG. 6, in the standardized unit control circuit, the address number of each contact or winding is represented by a variable label formed by three elements, e.g., SV*2*3. For example, in the variable label indicated at 13, the first element "SV" is a device label, the second element "*2" is a mechanism label variable and the third element "*3" is an action label variable. Like the actual address is just one and inherent to each device, mechanism or action, the label is just one and inherent to each device, mechanism or action and accordingly, labels of the same name cannot bear different contents or meanings. Accordingly in the standardized unit control circuit, the names of the mechanism and the action are represented by temporary labels which can be changed (such a label will be referred to as "variable label", hereinbelow) and the label is determined according to the mechanism and the action when the program is prepared or designed.

Procedure of standardizing a unit control circuit or procedure of creating various data bases on the basis of which a program is prepared employing the programming system of the present invention will be described with reference to FIG. 1, hereinbelow.

Figure 1A:
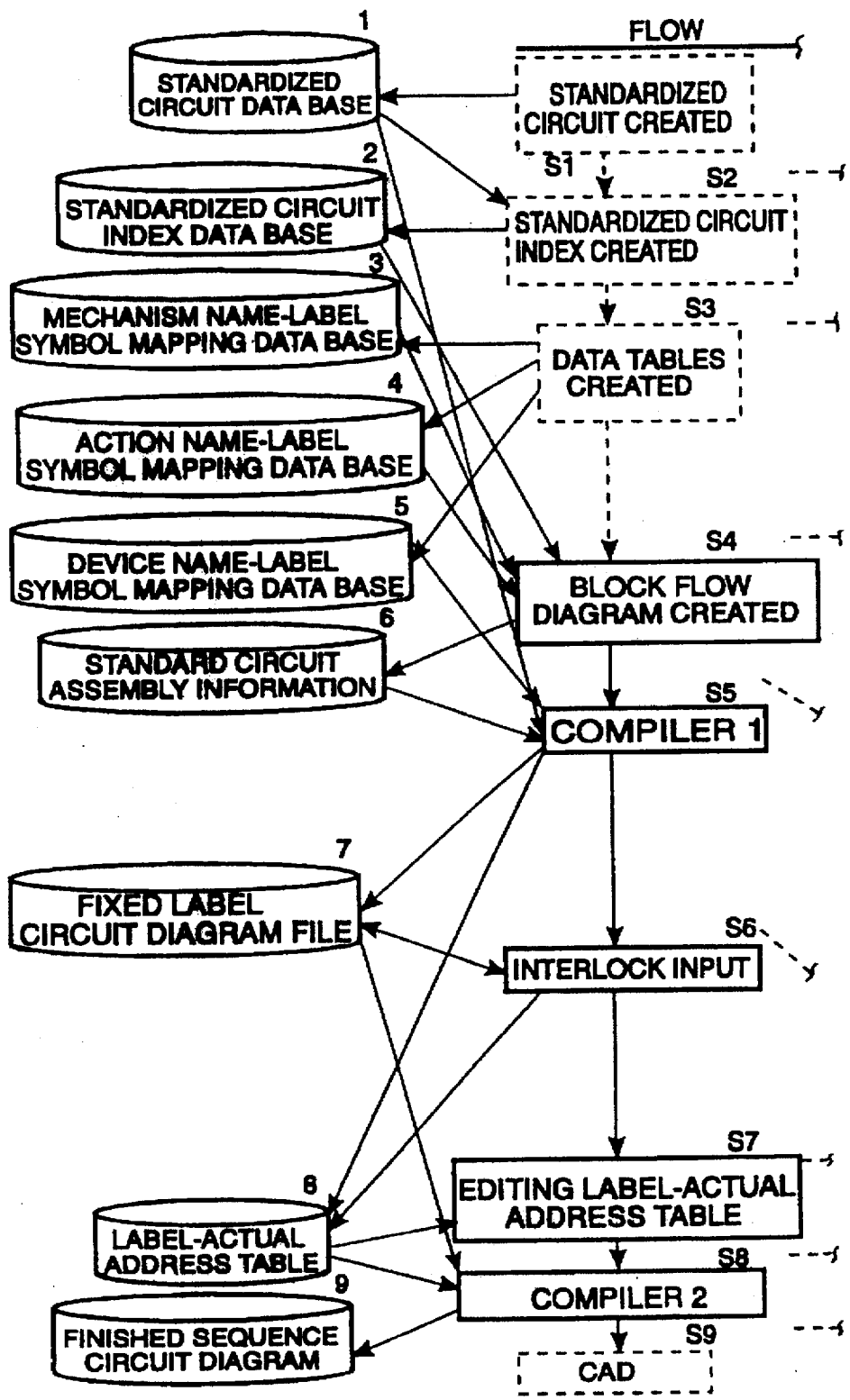
FIG. 1 is a flow chart for illustrating the procedure of preparing a program by use of a programming system in accordance with an embodiment of the present invention.

As shown in FIG. 1, in the preparatory work, unit control circuits for controlled devices (minimum controlled objects) are standardized to form standardized unit control circuits such as shown in FIG. 6, and the standardized unit control circuits obtained are stored in standardized circuit data base 1. (step S1)

Then a standardized circuit index table representing the correlation between each of the standardized unit control circuits and the file code (file name) thereof is created and stored in standardized circuit index data base 2. (step S2) The standardized circuit index data base 2 is a data base which is used when a standardized unit control circuit is designated or selected upon preparation of a program and stores therein the registration position (registration path), the file name and the name of each standardized unit control circuit (circuit name).

FIG. 2 shows an example of standardized circuit index data stored in the standardized circuit index data base 2.

Thereafter, a mechanism name-label symbol mapping data table, an action name-label symbol mapping data table and a device name-label symbol mapping data table are created and stored in a mechanism name-label symbol mapping data base 3, an action name-label symbol mapping data base 4 and a device name-label symbol mapping data base 5. (step S3)

The mechanism name-label symbol mapping data table is a data table which represents the correspondence between the name of each of the mechanisms forming the productive facilities and the label for the mechanism.

Figure 3:
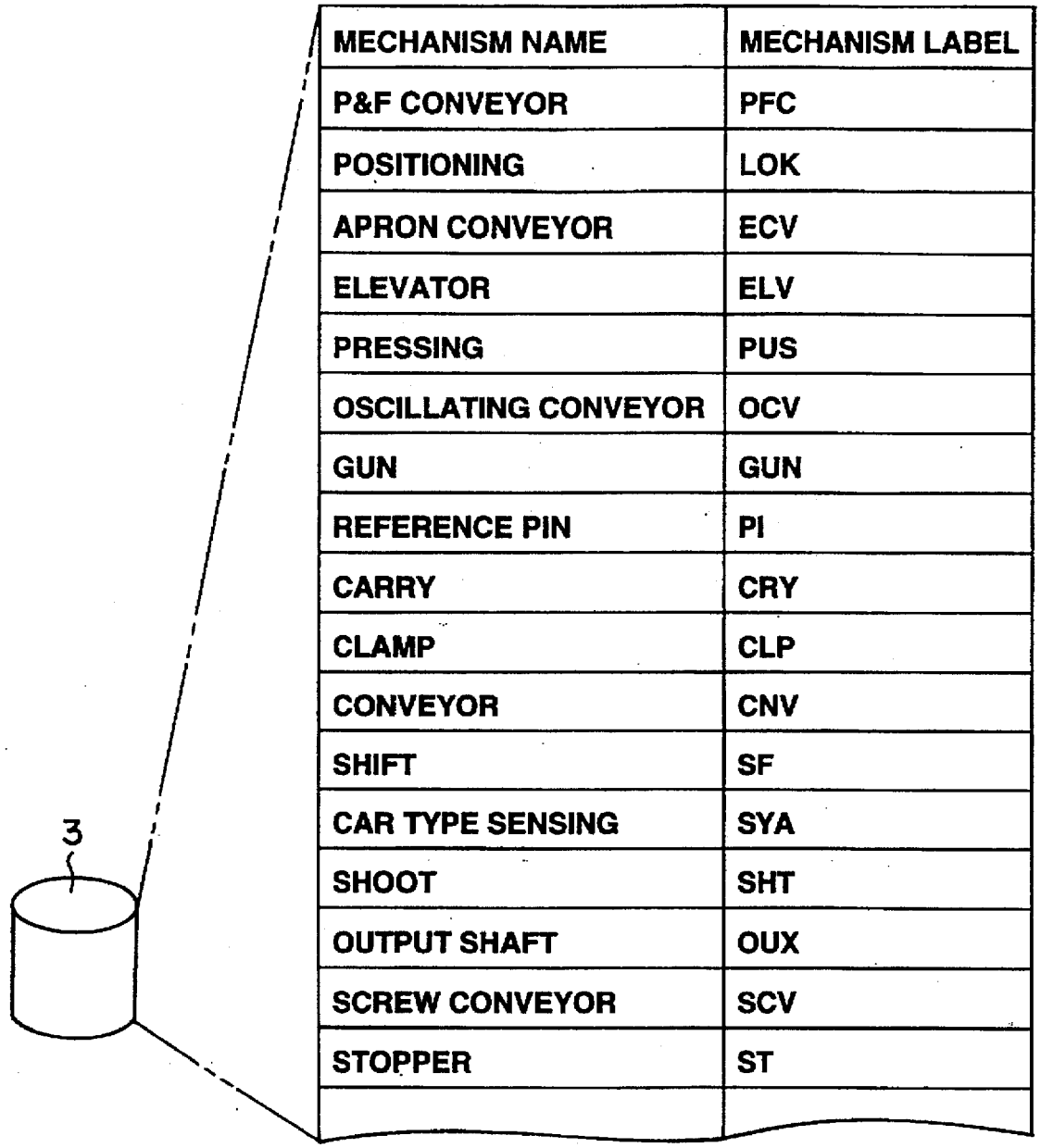
FIG. 3 is a view showing data stored in the mechanism name-label symbol mapping data base.

For example, the mechanism name-label symbol mapping data base 3 is a data base for allocating label symbols to the mechanism label variables upon preparation of a program (designing) and stores therein names of the mechanisms to be displayed on a CAD screen and mechanism label symbols to be allocated to the variable labels as shown in FIG. 3.

The action name-label symbol mapping data table is a data table which represents the correspondence between the name of action of each of the mechanisms and the label of the action (action label).

Figure 4:
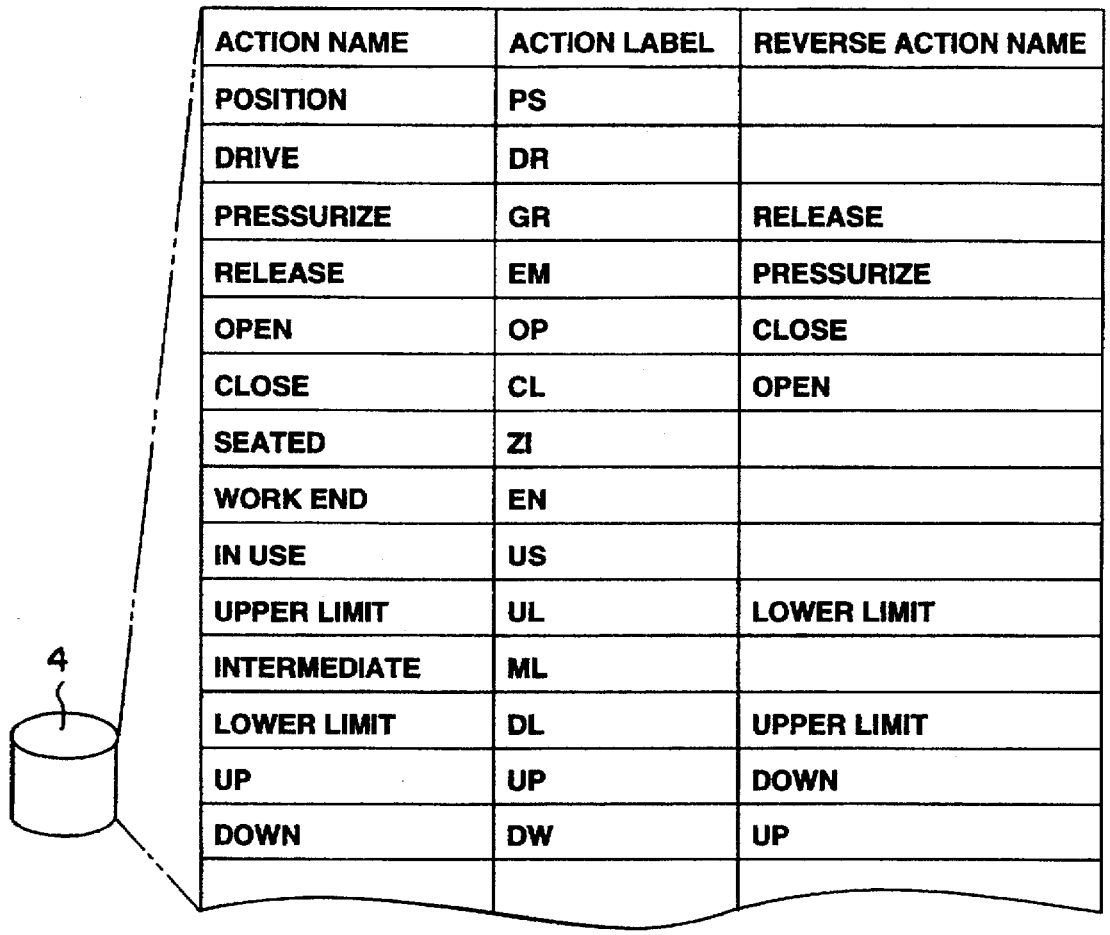
FIG. 4 is a view showing data stored in the action name-label symbol mapping data base.

For example, the action name-label symbol mapping data base 4 is a data base for allocating label symbols to the action label variables upon preparation of a program (designing) and stores therein names of the actions to be displayed on a CAD screen and action label symbols to be allocated to the variable labels as shown in FIG. 4.

The device name-label symbol mapping data table is a data table which represents the correspondence between the name of each of the devices and the label of the device.

The device name-label symbol mapping data base 5 stores therein data representing the correspondence between the device label symbols to be written in the standardized unit control circuit and the names of the devices.

The programming system is provided with a comment-label mapping data base 10 in which a data table representing the correspondence between comments and labels of the comments is stored as shown in FIG. 5 in addition to the aforesaid data bases 1 to 5.

Procedure of preparing a program using the programming system of the present invention will be described, hereinbelow.

Preparation of a program is executed in steps S4 to S8 in FIG. 1.

In step S4, a block flow diagram is created. The block is a rectangular region with ah identification number (FIG. 9) displayed on the CAD screen and each block corresponds to one unit control circuit. The block flow diagram comprises a plurality of blocks joined by transition lines and corresponds to a sequence program comprising a plurality of unit control circuits combined with each other. More particularly, by a format using such blocks (block format), sequence of selected standardized unit control circuits is designated and at the same time, designation of the standardized unit control circuit to be used in the block, allocation of the mechanism label symbol and allocation of the action label symbol are performed for each block.

In step S5, the variable labels in the sequence program are converted into fixed labels by the first compiler. More particularly, the standardized unit control circuit is copied onto a storage area for editing a transitional sequence program on the basis of information in the block flow diagram and label symbols are allocated to the mechanism label variables and the action label variables in the variable labels. The labels thus allocated are called the fixed labels.

At the same time, a comment for each circuit is automatically created and written in the transitional sequence program. Further a label-actual address table (to be described later) is created.

In step S6, external factors such as the timing of activation of the unit control circuit, the condition of interlock and the like in the standardized unit control circuit are input into the argument part 11 of each standardized unit control circuit and the labels of the argument parts 11 are added to the label-actual address table.

In step S7, actual addresses of the sequence are allocated to the fixed labels and defects in the comments created in step S5 (compiler 1) are corrected if any.

In step S8, the fixed labels are converted to actual addresses and the comments are reallocated, whereby a sequence program in which each contact or winding is represented by an actual address.

Thereafter if there remains a special part which has not been standardized and has to be designed, a circuit or circuits are added by use of a commercially available CAD or the like, thereby finishing the sequence program. Then other necessary works such as printing of a drawing of the sequence program, transfer of the sequence program to a PLC and the like are performed, thereby ending programming.

Contents of the work and/or processing to be effected in steps S4 to S9 in FIG. 1 will be described in more detail, hereinbelow.

(1) Step S4 (Creation of the Block Flow Diagram)

In step S4, the system or facility for which a sequence program is to be prepared is selected. That is, the operator selects the file name of the facility for which a sequence program is to be prepared.

Thereafter the block flow diagram is created in the following steps a), b) and c). Either of the steps a) and b) may be effected first. Information input or created here is stored in a standardized circuit assembly information file 6 by facility.

a) Setting of the Blocks

Block numbers are input in arbitrary positions on the screen according to the control specification of the facility as shown in FIG. 9. When the block numbers are input, rectangular block frames are displayed with numbers.

b) Join of Blocks

Figure 10:
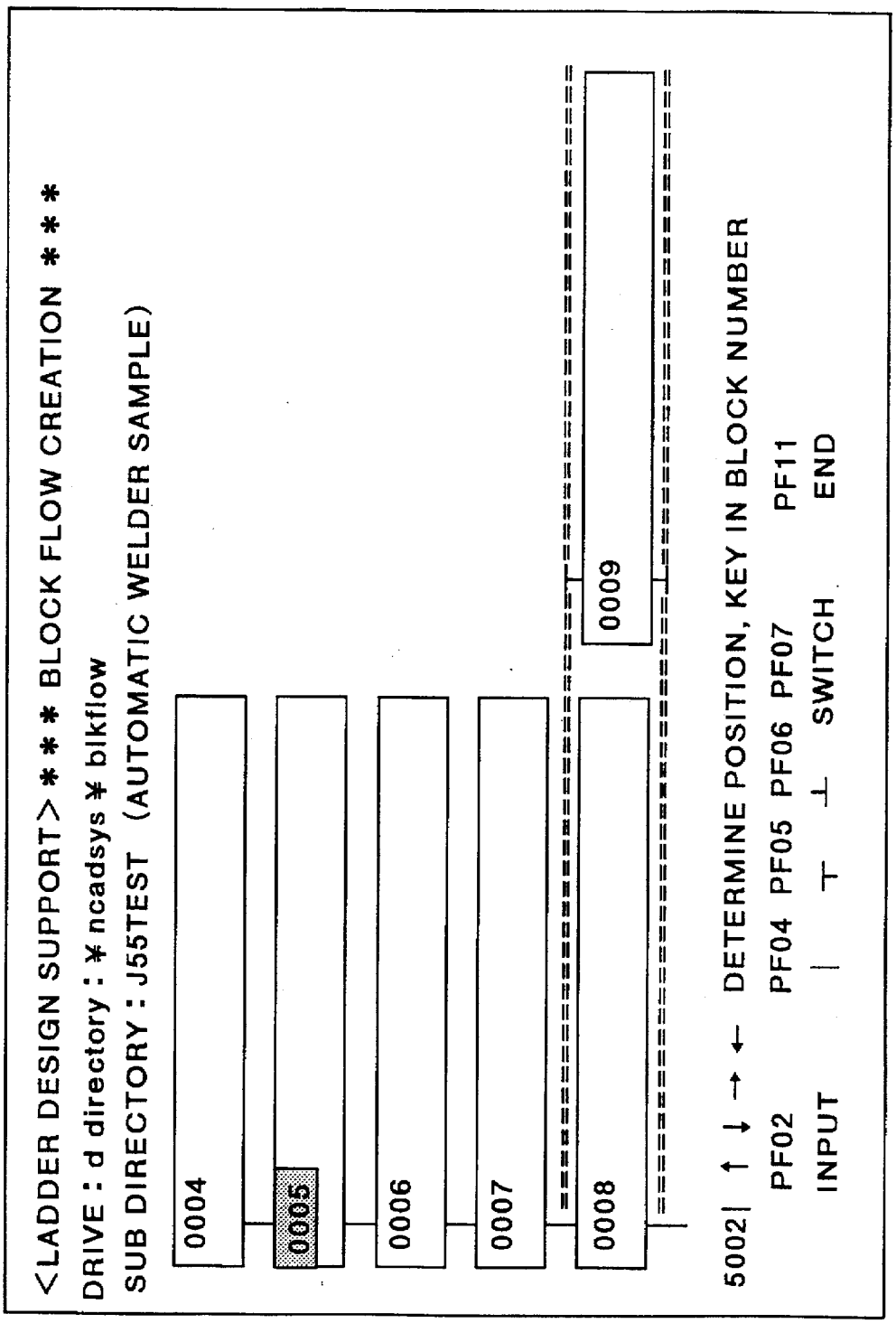
FIG. 10 is a view similar to FIG. 9 but after setting the transition lines.

As shown in FIG. 10, the blocks are joined by transition lines. The transition lines represent the control timing of the blocks. The transition line | represents that control of the block on the upper side of the line is to be effected first and then control of the lower side of the line is to be effected. The transition line _ represents that blocks between a pair of the transition lines _ are to be controlled simultaneously and the transition line _ represent that either of the blocks between a pair of the transition lines _ is to be controlled.

c) Information Input into the Blocks

Figure 11:
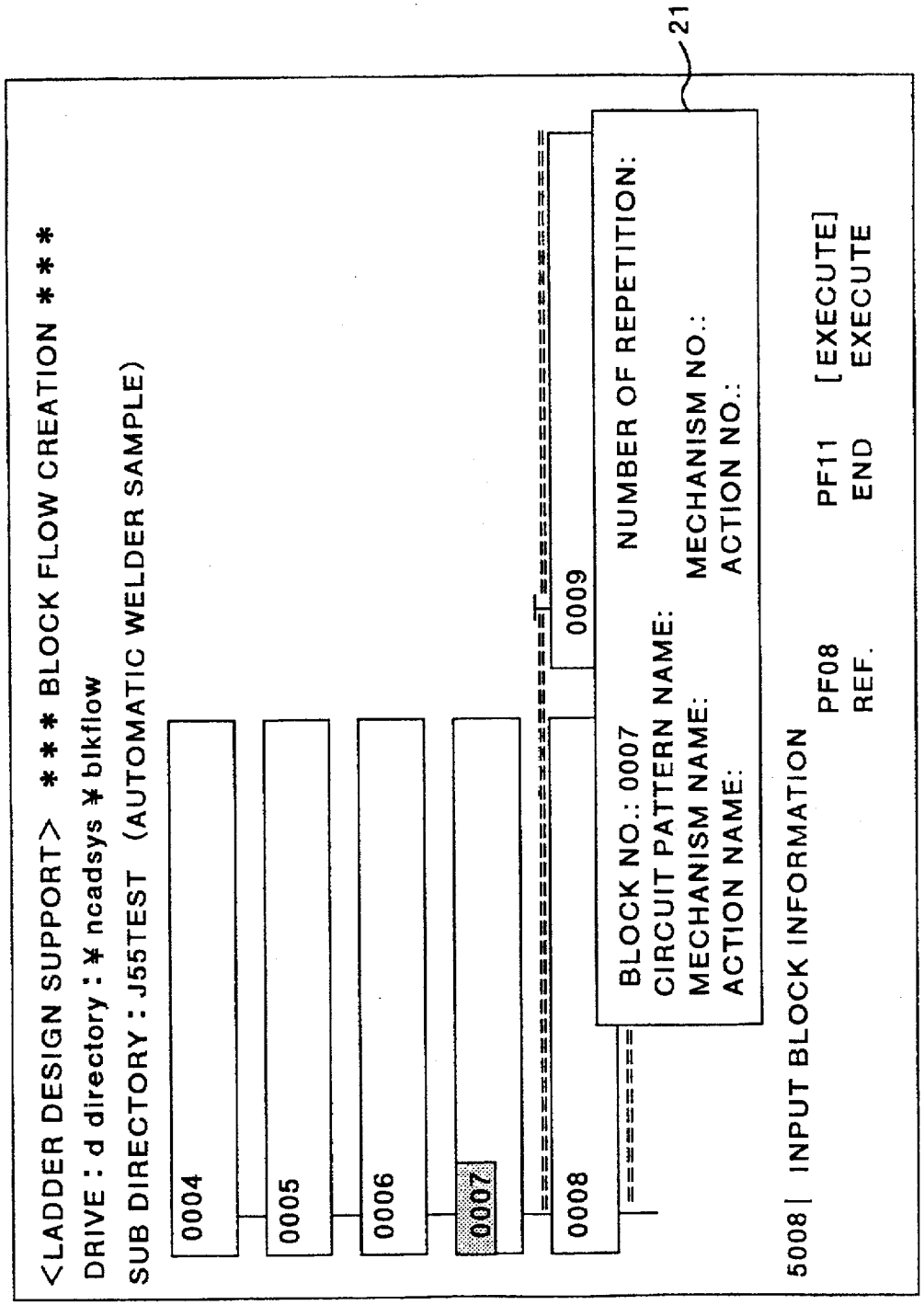
FIG. 11 is a view similar to FIG. 9 but in which the information input window is displayed.

Information is input into each block. As shown in FIG. 11, a block into which information is to be input is selected first and the cursor is moved to the block. Thereafter information input execution key is operated to display a information input window.

Figure 12A:
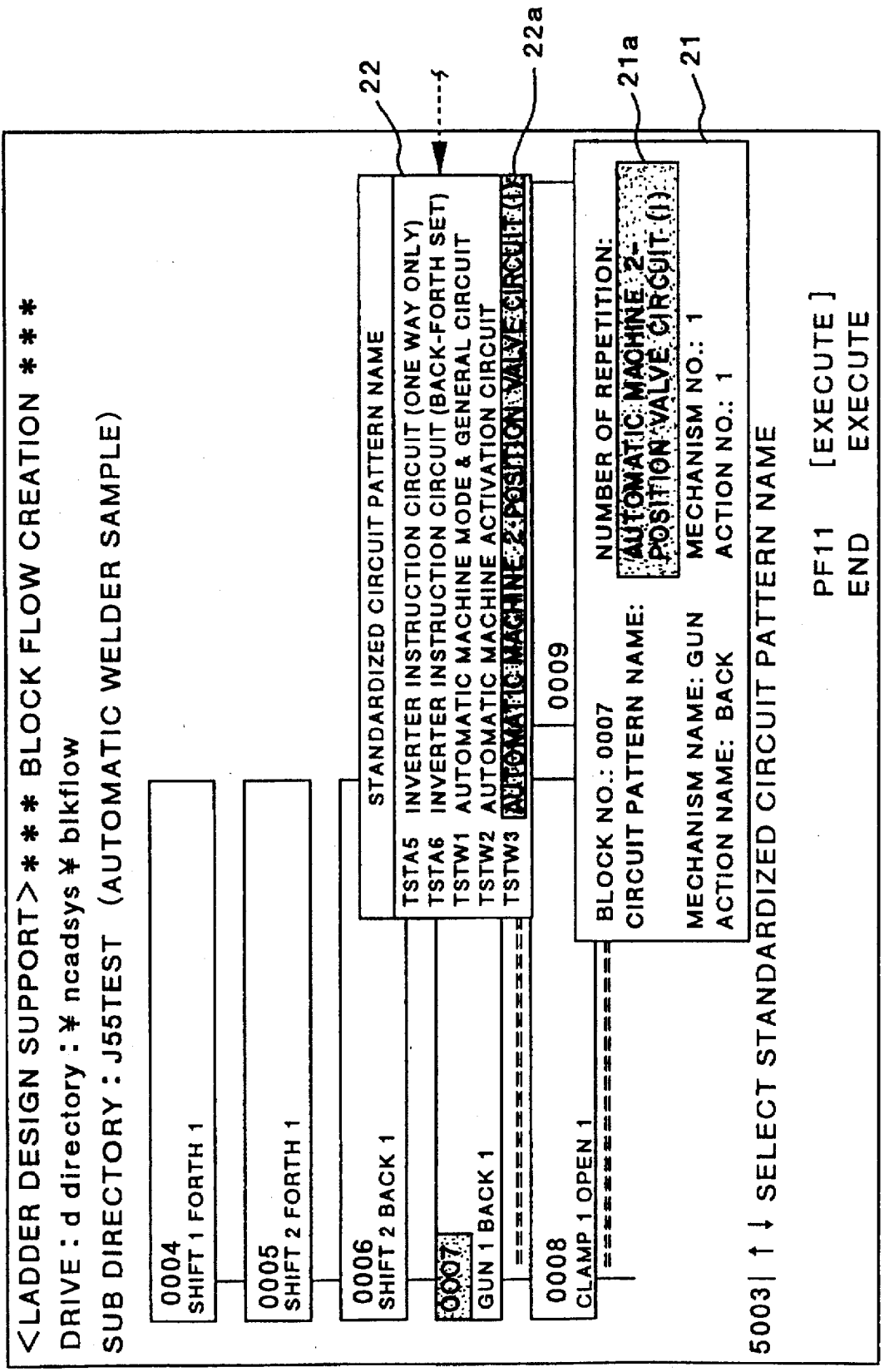
FIG. 12 is a view similar to FIG. 9 but in which the standardized index display window is displayed.

Then as shown in FIG. 12, a standardized unit control circuit to be used for the block is selected. More particularly a standardized circuit index is displayed in a data base reference window and a standardized unit control circuit to be used for the block is selected in the window. In the example shown in FIG. 12, a two-position valve circuit for an automatic machine whose file name is TSTW4 is selected. The name of the standardized unit control circuit to be used in the block is displayed in the information input window 21 as indicated at 21a.

Figure 13A:
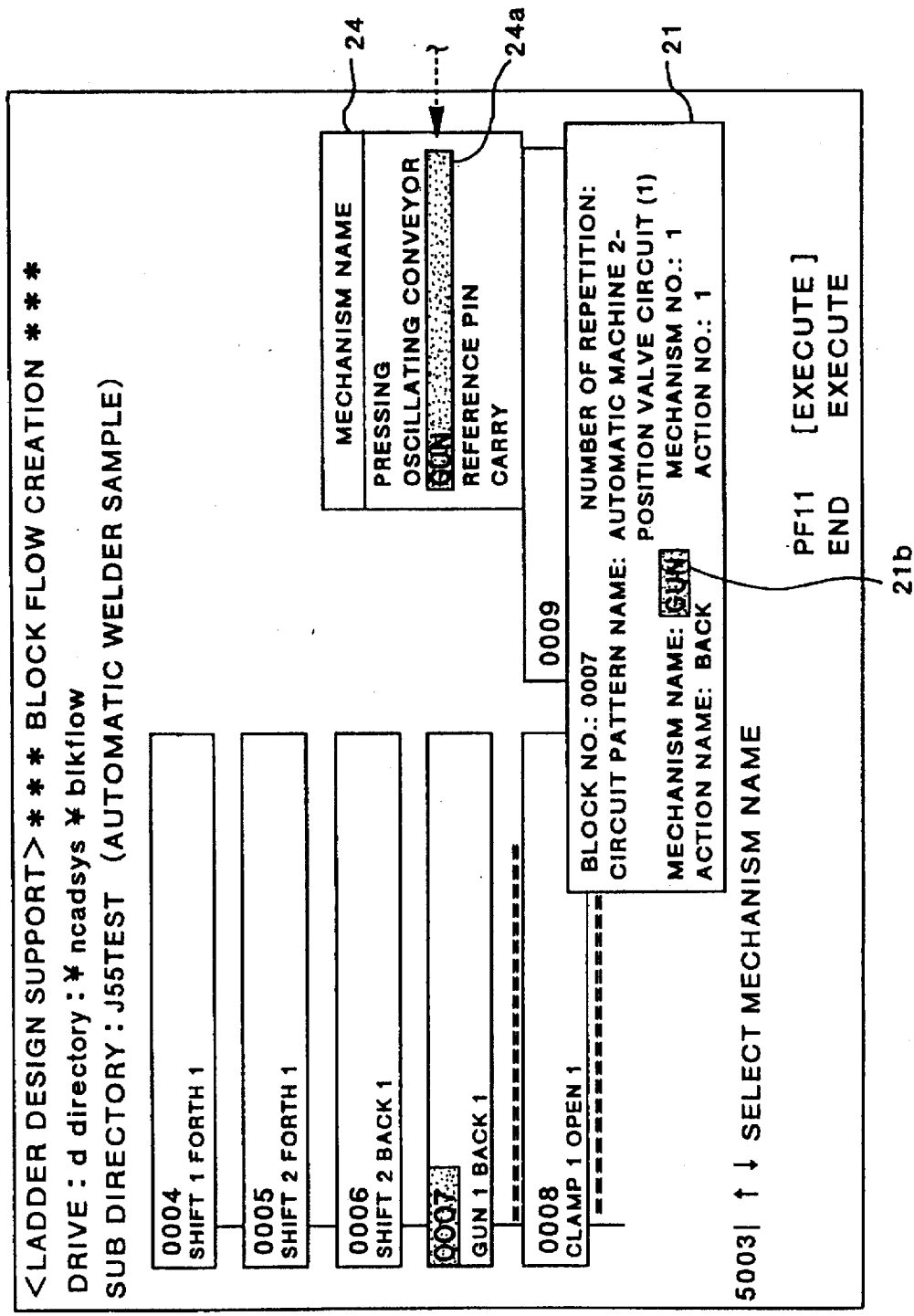
FIG. 13 is a view similar to FIG. 9 but in which the mechanism name display window is displayed.

Then as shown in FIG. 13, the name and the label symbol of the mechanism to be controlled in the block are selected or designated. More particularly, names of the mechanisms are displayed in a mechanism name display window 24 and the name of the mechanism to be controlled in the block is selected in the window. In the example shown in FIG. 13, a gun whose label symbol is GUN is selected as indicated at 24a. The name of the mechanism to be used in the block is displayed in the information input window 21 as indicated at 21b.

Further as shown in FIG. 14, the name of action and the action label symbol of the mechanism to be controlled in the block are selected. More particularly, names of actions are displayed in an action name display window and an action of the mechanism is selected in the window as indicated at 26a. The name of the action to be used in the block is displayed in the information input window 21 as indicated at 21c.

When there are a plurality of mechanisms or actions which bear the same name in a facility, mechanism numbers or action numbers are input in order to distinguish the mechanisms or the actions from each other.

(2) Step S5 (Compiler 1)

In step S5, the file name of the facility for which a program is to be prepared is selected. When the file name is selected, copying of the standardized unit control circuit and compile of the variable label to the fixed label are automatically effected, and a transitional sequence program after the compile is automatically stored in a fixed label circuit diagram file 7 by facility. More particularly, the following processings a), b), c) and d) are automatically executed.

a) Copying the Standardized Unit Control Circuit

A diagram of the standardized unit control circuit corresponding to the designated file name is copied onto the screen, for instance, as shown in FIG. 6.

b) Compile of Variable Labels to Fixed Labels

Label conversion (compile) is performed to the copied standardized unit control circuit (FIG. 6) and a transitional unit control circuit (i.e., a transitional sequence program) in which each contact or winding is labeled with a fixed label is created. More particularly, for instance, a standardized unit control circuit shown in FIG. 6 is converted into a transitional unit control circuit (transitional sequence program) shown in FIG. 7. In this conversion, for instance, a variable label "SV*2*3" indicated 13 in FIG. 6 is converted into a fixed label "SV, ST1OP1" indicated at 14 in FIG. 7. FIG. 7 shows the result of conversion in which a stopper (mechanism label=ST) is allocated to the name of the mechanism and opening (action label=OP) is allocated to the name of the action for the standardized unit control circuit shown in FIG. 6. Further in the example shown in FIG. 7, [*2], [*3] and [$3] are respectively converted into [ST], [OP] and [CL], and the mechanism number and the action number are allocated.

c) Automatic Creation of Comments

Comments are automatically created on the basis of the standardized circuit assembly information file 6, the mechanism name-label symbol mapping data base 3, the action name-label symbol mapping data base 4 and the device name-label symbol mapping data base 5. The comments are descriptions written at the right end in the diagram of the sequence program such as indicated at 15 in FIG. 7.

d) Creation of the Label-Actual Address Table

Figure 16B:
FIG. 16 is a view showing a part of the label-actual address table before the actual addresses are set.
Figure 18B:
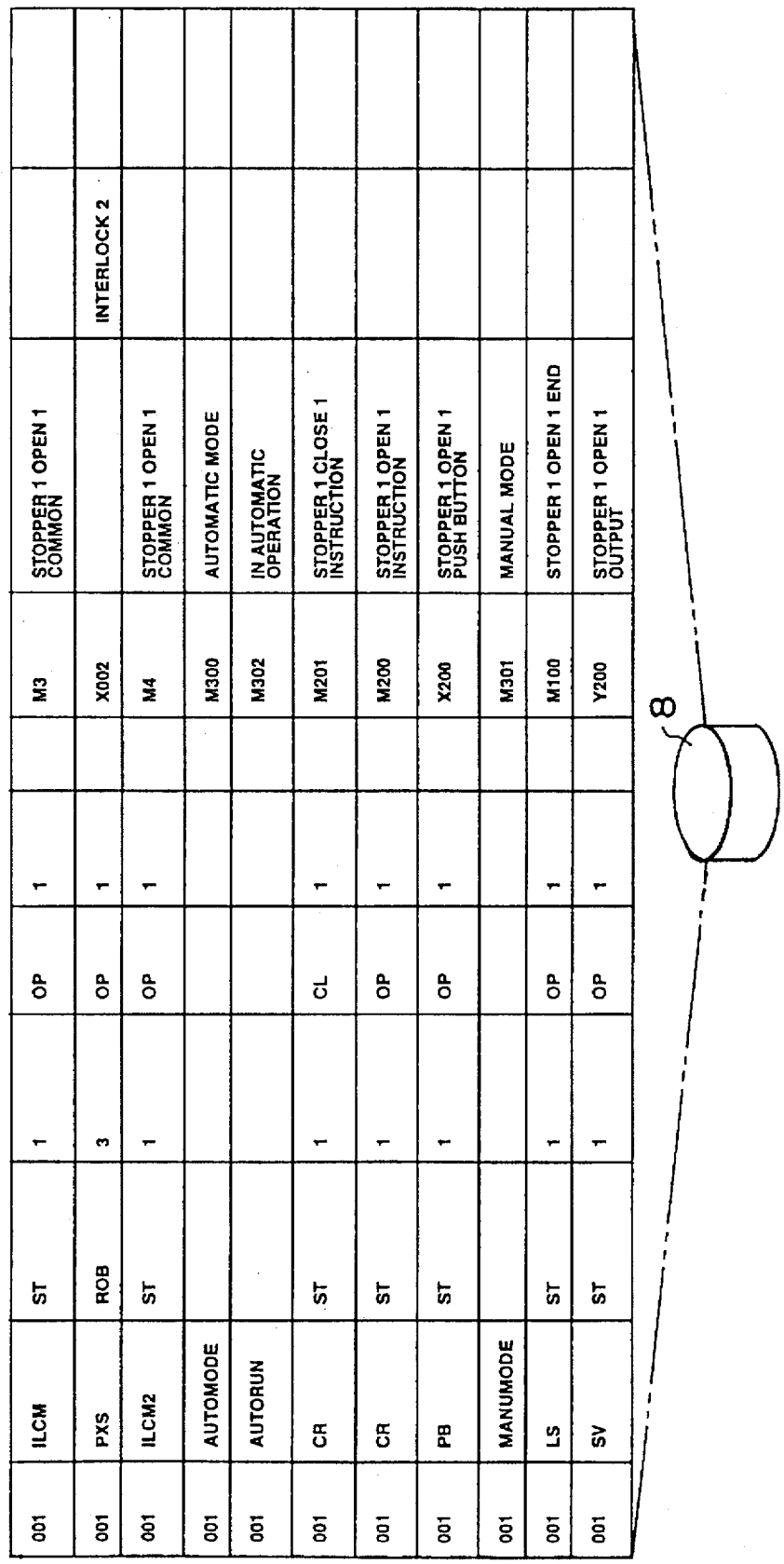
FIG. 18 is a view showing a part of the label-actual address table after the actual addresses are set.
Figure 19:
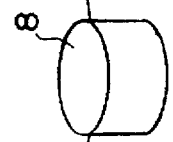
FIG. 19 is a view showing the other part of the label-actual address table after the actual addresses are set.

A label-actual address table (in which actual addresses has not been allocated) such as shown in FIGS. 16 and 17 for allocating actual addresses of the sequence to the fixed labels is automatically created and is stored in a label-actual address table file 8.

(3) Step S6 (Interlock Input)

Figure 15:
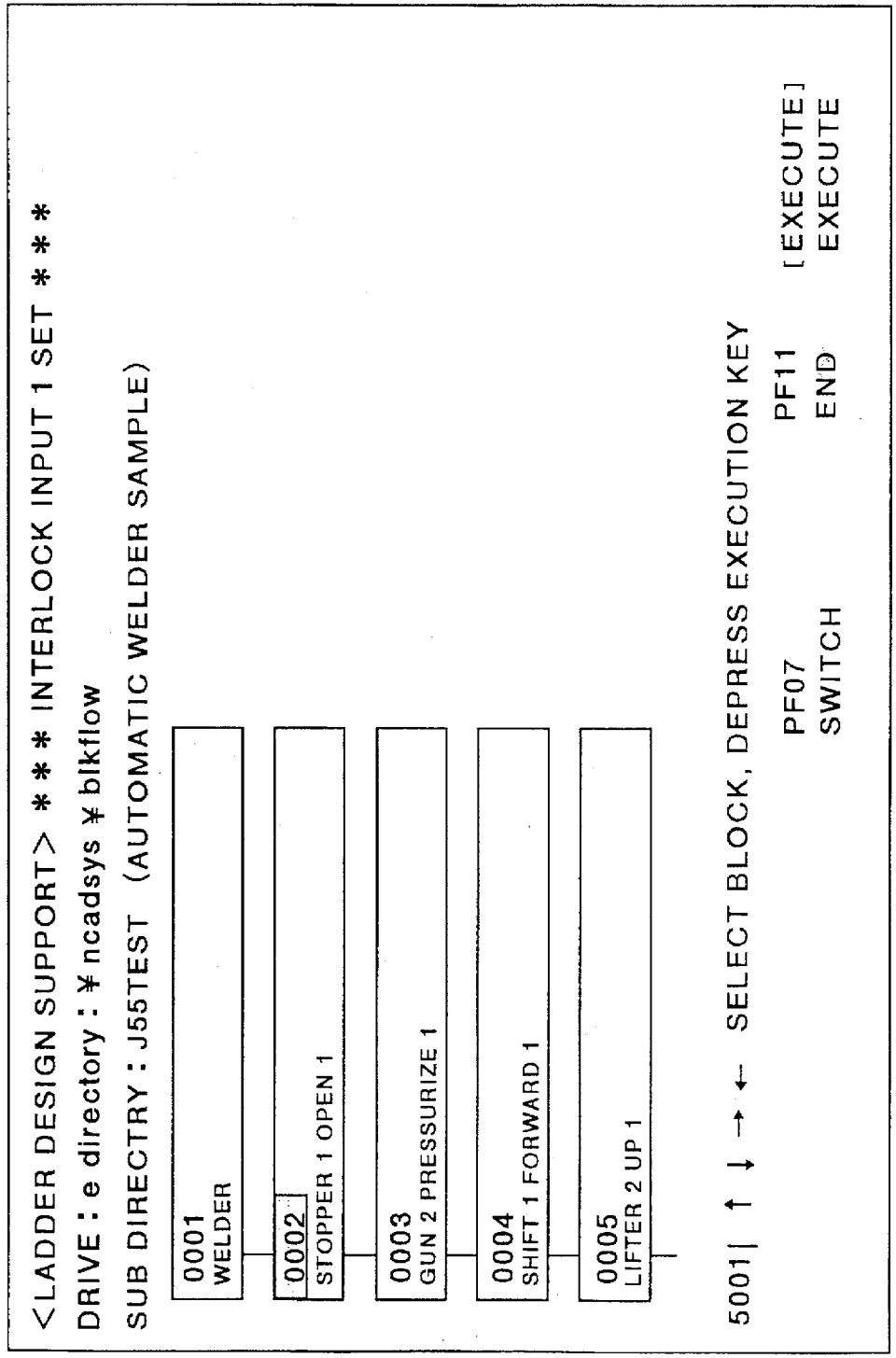
FIG. 15 is a view showing an example of an interlock input screen of the programming system.

In step S6, the file name of the facility for which a sequence program is to be prepared is selected and an interlock input screen such as shown in FIG. 15, and a block into which interlock input or the like is to be performed, i.e., a block into which an argument is to be input, is designated. This screen is of the same type as the block flow creation screen shown in FIG. 9.

Then the argument part is input. More particularly, the argument part is input by automatically activating a commercially available CAD in the editing state of the diagram of the selected block. In this case, modification for a special specification of the facility may be made as shown in FIG. 8 by the chained line in addition to input of the argument part shown by the broken line in FIG. 8.

Then data added by the interlock input are added to the label-actual address table shown in FIGS. 16 and 17. In this case, the label or the comment input in the argument part is automatically added to the label-actual address table.

(4) Step S7 (Editing the Label-Actual Address)

In step S7, the file name of the facility for which a sequence program is to be prepared is selected and then actual address numbers of the sequence are allocated to the actual address fields in the label-actual address table. Thereafter if necessary the comments are corrected. Thus a label-actual address table with actual addresses is created. The label-actual address table is stored in the label-actual address table file 8.

(5) Step S8 (Compiler 2)

In step S8, the file name of the facility for which a sequence program is to be prepared is selected and when the file is selected, a transitional sequence program (transitional unit control circuit) in which each contact or winding is labeled with a fixed label is automatically compiled to a sequence program in which each contact or winding is labeled with an actual address as shown in FIGS. 20 and 21 according to the label-actual address table. The sequence program thus prepared is stored in a finished sequence circuit diagram file 9.

If the comments were corrected in step S7, the corrected comments are allocated to the sequence program diagram (reallocation of the comments).

(6) Step S9 (Processing by a Commercially Available CAD)

In step S9, a special part which cannot be standardized is designed by use of a commercially available CAD or the like, thereby finishing the sequence program. If there is no such special part, the sequence program has been finished in step S8.

Then other necessary works such as printing of a drawing of the sequence program the like are performed, thereby ending programming.

What is claimed is:

1. A programming system for preparing a sequence program for controlling a predetermined system, wherein said sequence program is formed by a plurality of contacts or windings each of which is given an actual address representing a name of a mechanism which forms the system and the action to be controlled, a name of an action of the mechanism and a name of a controlled device which is directly controlled to control the action of the mechanism, said programming system comprising;

a standardized control circuit holding means which holds a plurality of standardized control circuits each formed by a plurality of contacts or windings each of which is given a variable label representing a name of a mechanism which forms a system and the action to be controlled, a name of an action of the mechanism and a name of a controlled device which is directly controlled to control the action of the mechanism, a standardized control circuit editing means which fetches from the standardized control circuit holding means a plurality of standardized control circuits designated according to sequence control characteristics of said predetermined system and edits the standardized control circuits, thereby creating a first transitional sequence program formed by contacts or windings each of which is given a variable label, a first label converting means which converts each of the variable labels in the first transitional sequence program into a fixed label which corresponds to the name of the mechanism to be controlled by each of the standardized control circuits and the designated action thereof, thereby creating a second transitional sequence program and, a second label converting means which converts each of the fixed labels in the second transitional sequence program into an actual address on the basis of a table representing correspondence between the fixed labels and actual addresses, thereby finishing a sequence program for said predetermined system.

2. A programming system as defined in claim 1 wherein the first label converting means gives a comment representing the contents of control of each standardized control circuit to the second transitional sequence program when the first label converting means converts the variable labels to the fixed labels.

3. A programming system as defined in claim 1 wherein each standardized control circuit is created for a minimum unit device which is directly controlled by the sequence program to control a mechanism whose action is to be controlled.

4. A programming system as defined in claim 3 wherein each standardized control circuit comprises a control circuit part related to a basic control of the device and an argument part related to external factors.

5. A programming system as defined in claim 4 wherein the external factors include the timing of activation of the control circuit and the condition of interlock for preventing interference between systems.

6. A programming system as defined in claim 1 wherein the first label converting means converts the variable labels in the first transitional sequence program into the fixed labels separately by standardized control circuit.

7. A programming system as defined in claim 1 wherein file codes of the standardized control circuits, device name labels, mechanism name labels and action name labels are respectively stored in data bases.

8. A programming system as defined in claim 7 wherein the standardized control circuit editing means fetches standardized control circuits from the standardized control circuit holding means by designating file codes on the basis of a table representing the correspondence between the standardized control circuits and the file codes.

9. A programming system as defined in claim 1 wherein the actual address is inherent to each system.

10. A programming system as defined in claim 9 wherein the actual addresses are given in order to distinguish the mechanisms to be controlled, the actions thereof and the controlled devices which are directly controlled to control the actions of the mechanisms.

* * * * *